United States Patent
Sawai

(10) Patent No.: US 9,026,037 B2
(45) Date of Patent: May 5, 2015

(54) COMMUNICATION SYSTEM, RELAY NODE, USER EQUIPMENT AND BASE STATION

(75) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 13/390,726

(22) PCT Filed: Jul. 29, 2010

(86) PCT No.: PCT/JP2010/004817
§ 371 (c)(1),
(2), (4) Date: Feb. 16, 2012

(87) PCT Pub. No.: WO2011/036839
PCT Pub. Date: Mar. 31, 2011

(65) Prior Publication Data
US 2012/0149296 A1   Jun. 14, 2012

(30) Foreign Application Priority Data

Sep. 25, 2009   (JP) ................................. 2009-220481
Feb. 25, 2010   (JP) ................................. 2010-040227

(51) Int. Cl.
*H04W 88/04*   (2009.01)
*H04B 7/14*   (2006.01)
*H04W 40/00*   (2009.01)
(Continued)

(52) U.S. Cl.
CPC ........... *H04B 7/2606* (2013.01); *H04W 72/082* (2013.01); *H04W 84/047* (2013.01)

(58) Field of Classification Search
CPC .. H04W 88/04; H04W 36/001; H04B 7/2606; H04L 2001/0097
See application file for complete search history.

(56) References Cited

U.S. PATENT DOCUMENTS

2007/0291663 A1*   12/2007   Dixit et al. ..................... 370/254
2009/0103472 A1*   4/2009   Ni et al. ......................... 370/315
(Continued)

FOREIGN PATENT DOCUMENTS

| JP | 2009-118320 | 5/2009 |
| JP | 2009 118320 | 5/2009 |

(Continued)

OTHER PUBLICATIONS

U.S. Appl. No. 13/394,824, filed Mar. 8, 2012, Sawai.
(Continued)

*Primary Examiner* — Bobbak Safaipour
(74) *Attorney, Agent, or Firm* — Oblon, McClelland, Maier & Neustadt, L.L.P.

(57) ABSTRACT

A relay node in a mobile communication network for receiving a radio signal from a base station and forwarding the signal to a mobile station. The relay node including a control unit that manages first information corresponding to link between the relay node and the mobile station, and a transmitter that directly transmits the first information to another relay node in the mobile communication network. The relay node including a receiver that receives, from the another relay node, second information corresponding to a link between the another relay node and another mobile station. The control unit controlling resources used to communicate with the mobile station based on the first information corresponding to link between the relay node and the mobile station and the second information corresponding to the link between the another relay node and the another mobile station.

20 Claims, 28 Drawing Sheets

(51) Int. Cl.
*H04W 24/00* (2009.01)
*H04B 7/26* (2006.01)
*H04W 72/08* (2009.01)
*H04W 84/04* (2009.01)

(56) References Cited

U.S. PATENT DOCUMENTS

| | | | |
|---|---|---|---|
| 2009/0116423 A1* | 5/2009 | Ni et al. | 370/315 |
| 2009/0303996 A1* | 12/2009 | Takase et al. | 370/390 |
| 2010/0067427 A1* | 3/2010 | Choudhury | 370/315 |
| 2010/0329216 A1* | 12/2010 | Jen | 370/332 |
| 2011/0038376 A1* | 2/2011 | Wiemann et al. | 370/394 |
| 2012/0170508 A1* | 7/2012 | Sawai | 370/315 |

FOREIGN PATENT DOCUMENTS

| | | |
|---|---|---|
| JP | 2009-219039 | 9/2009 |
| JP | 2009 219039 | 9/2009 |

OTHER PUBLICATIONS

3GPP TSG RAN WG2, "Information exchange over a wireless X2 interface between relay nodes," Sharp, Meeting #66, R2-092827, Total 3 pages, (May 4-8, 2009).

3GPP TSG RAN WG3, "First Consideration on RAN3 Issues for Relaying," Nokia Siemens Networks, Nokia, Meeting #63bis, R3-090890, Total 3 pages, (Mar. 23-27, 2009).

3GPP TS 36.423, V8.6.0, "$3^{rd}$ Generation Partnership Project; Technical Specification Group Radio Access Network; Evolved Universal Terrestrial Radio Access Network (E-UTRAN); X2 application protocol (X2AP)," vol. 8, No. 6, Total 100 pages, (Jun. 2009).

3GPP TSG RAN WG1, "Low load scenarios with CQi-based interference coordination," Nokia & Nokia Siemens Networks, Meeting #50bis, R1-074350 Total 5 pages, (Oct. 8-12, 2007).

International Search Report Issued Aug. 24, 2010 in PCT/JP10/04817 Filed Jul. 29, 2010.

* cited by examiner

FIG. 3
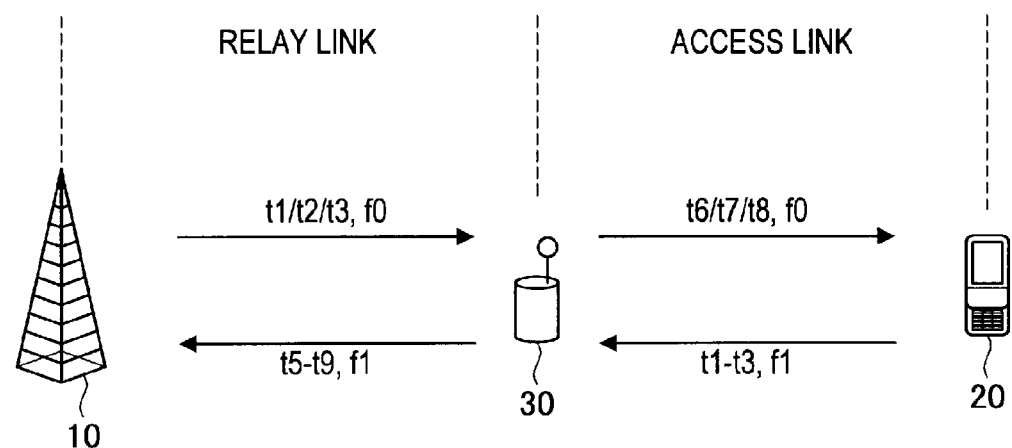
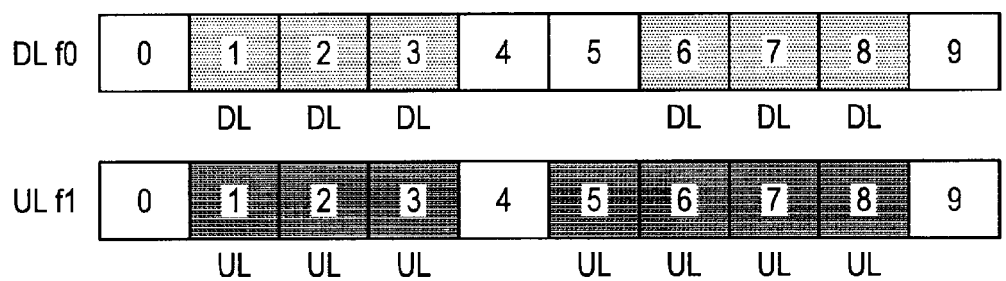

FIG. 21

| | IF BETWEEN MACRO CELL AND BASE STATION | ACCESS | ASSUMED LOCATION |
|---|---|---|---|
| RRH CELL BASE STATION | OPTICAL FIBER | OPEN TO ALL USER EQUIPMENT | OUTDOOR |
| HOTZONE BASE STATION | X2 | OPEN TO ALL USER EQUIPMENT | OUTDOOR |
| FEMTOCELL BASE STATION | X2 TUNNELING PROTOCOL ON PBN | CLOSED GROUP | INDOOR |
| RELAY NODE (RELAY BASE STATION) | RADIO (SO-CALLED RELAY LINK) | OPEN TO ALL USER EQUIPMENT | OUTDOOR |

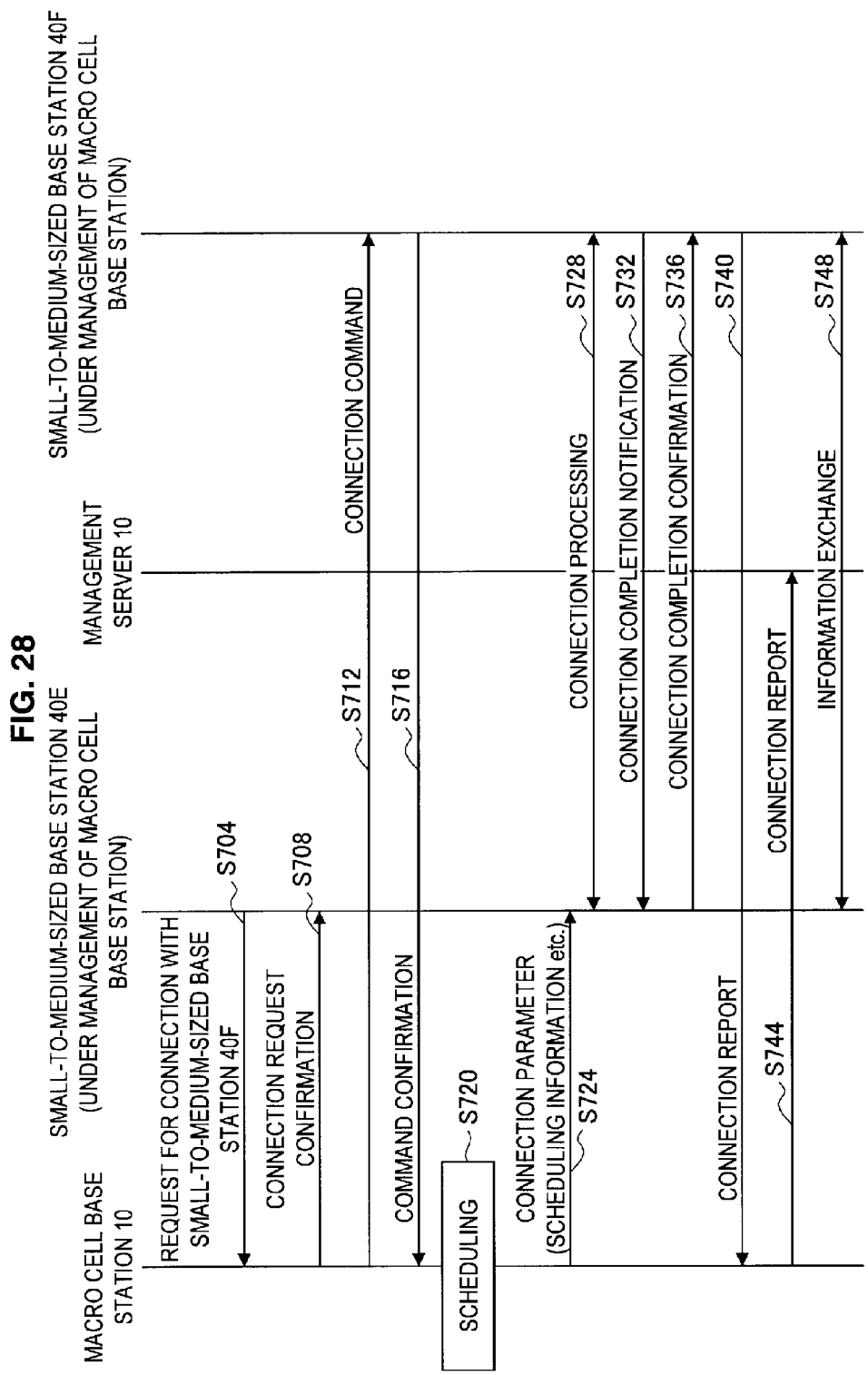

US 9,026,037 B2

COMMUNICATION SYSTEM, RELAY NODE, USER EQUIPMENT AND BASE STATION

CROSS REFERENCES TO RELATED APPLICATIONS

This application claims the benefit of priority under 35 U.S.C. 119 from Japanese Patent Application 2009-220881, filed Sep. 25, 2009, and Japanese Patent Application 2010-040227, filed Feb. 25, 2010, the entire contents of each which are incorporated herein by reference.

TECHNICAL FIELD

The present invention relates to a communication system, a relay note, a user equipment and base station.

BACKGROUND ART

A relay technique is standardized in IEEE (Institute of Electrical and Electronics Engineers) 802.16j. Further, in 3GPP (3rd Generation Partnership Project) LTE-A (Long Term Evolution-Advanced) also, a technique using a relay node (RN) is studied actively in order to improve the throughput of a user equipment (UE) located at the cell edge.

The relay node receives a signal transmitted from a base station, amplifies the signal and transmits the amplified signal to the user equipment in the downlink. Such a relay in the relay node ensures a higher signal-to-noise ratio compared to directly transmitting a signal from the base station to the user equipment. Likewise, the relay node relays a signal transmitted from the user equipment to the base station in the uplink, thereby maintaining a high signal-to-noise ratio. The relay node is disclosed in the following non-patent literatures 1 to 3, for example.

The transmission power of a signal transmitted by the user equipment near the cell edge is sufficiently small. Thus if there is no relay node, interference with the adjacent cell is not a significant problem.

CITATION LIST

Non Patent Literature

[NPL 1] R1-090015, "Consideration on Relay.ppt", China Potevio, CATT, January 2009
[NPL 2] R1-090065, "Joint analog network coding and Relay", Alcatel-Lucent, January 2009
[NPL 3] R1-091803, "Understanding on Type 1 and Type 2 Relay", Huawei, May 2009

SUMMARY OF INVENTION

Technical Problem

If relay nodes belonging to different base stations are located near each cell edge, however, the interference between cells due to each relay node would be more significant problem since the relay nodes transmit signals in larger transmission power than the user equipment.

Regarding the problem above, it may be effective that each relay node exchanges information through each base station to avoid interference based on the exchanged information. However, it takes time to exchange information through base station, it is assumed that it is difficult to speedily cope with a change of communication status.

In light of the foregoing, it is desirable to provide a communication system, a relay node, a user equipment and a base station which are novel and improved, and with which one or more than one small-to-medium-sized base station such as relay nodes can directly communicate.

Solution to Problem

One exemplary embodiment of the specification is directed to a relay node in a mobile communication network for receiving a radio signal from a base station and forwarding the signal to a mobile station. The relay node including a control unit that manages first information corresponding to link between the relay node and the mobile station, and a transmitter that directly transmits the first information to another relay node in the mobile communication network. The relay node including a receiver that receives, from the another relay node, second information corresponding to a link between the another relay node and another mobile station. The control unit controlling resources used to communicate with the mobile station based on the first information corresponding to link between the relay node and the mobile station and the second information corresponding to the link between the another relay node and the another mobile station.

The relay node may be configured to determine that the link between the another relay node and the another mobile station may interfere with the link between the relay node and the mobile station based on the first information corresponding to the link between the relay node and the mobile station and the second information corresponding to the link between the another relay node and the another mobile station. The control unit may be configured to modify resources used to communicate with the mobile station based on the determination that the link between the another relay node and the another mobile station may interfere with the link between the relay node and the mobile station.

The receiver may be configured to receive resource allocation information from the base station indicating communication resources assigned to the relay node for directly communicating with the another relay node, and directly transmit the first information to the another relay node in the mobile communication network based on the resource allocation information received from the base station.

The relay node may further comprise a relay node detection unit configured to detect the existence of the another relay node by detecting a signal transmitted from the another relay node; and an interference determining unit configured to determine that the signal detected by the relay node detection unit may interfere with the link between the relay node and the mobile station.

The relay node detection unit may be configured to detect the existence of the another relay node based on signals transmitted from another base station to which the another relay node is linked, and the control unit requests a direct communication link with the another relay node to the another base station.

The relay node detection unit may be configured to detect the existence of the another relay node based on signals transmitted from the another relay node, and the control unit requests a direct communication link with the another relay node to the base station to which the relay node is linked.

The relay node detection unit may be configured to detect the existence of the another relay node based on signals transmitted from the another relay node, and the control unit requests a direct communication link with the another relay node by transmitting a connection request directly to the another relay node.

The first information corresponding to the link between the relay node and the mobile station may include at least one of identification information corresponding to the mobile station, an allowable interference level corresponding to the link between the relay node and the mobile station, a channel quality indicator (CQI) corresponding to the link between the relay node and the mobile station, quality of service (QoS) information corresponding to a required quality of the link between the relay node and the mobile station, and a position of the relay node.

Another exemplary embodiment is directed to a computer readable medium including computer program instructions, which when executed by a relay node in a communication network, cause the relay node to perform a method of receiving a radio signal from a base station and forwarding the signal to a mobile station. The method may include managing first information corresponding to a link between the relay node and the mobile station; directly transmitting the first information to another relay node in the mobile communication network; receiving, from the another relay node, second information corresponding to a link between the another relay node and another mobile station; and controlling resources used to communicate with the mobile station based on the first information corresponding to the link between the relay node and the mobile station and the second information corresponding to the link between the another relay node and the another mobile station.

The method may further include determining that the link between the another relay node and the another mobile station may interfere with the link between the relay node and the mobile station based on the first information corresponding to the link between the relay node and the mobile station and the second information corresponding to the link between the another relay node and the another mobile station.

The method may further include modifying resources used to communicate with the mobile station based on the determination that the link between the another relay node and the another mobile station may interfere with the link between the relay node and the mobile station.

Another exemplary embodiment is directed to a method performed by a relay node in a communication network of receiving a radio signal from a base station and forwarding the signal to a mobile station. The method may include managing, at a control unit of the relay node, first information corresponding to a link between the relay node and the mobile station; directly transmitting, by a transmitter of the relay node, the first information to another relay node in the mobile communication network; receiving, at a receiver of the relay node from the another relay node, second information corresponding to a link between the another relay node and another mobile station; and controlling, at the control unit of the relay node, resources used to communicate with the mobile station based on the first information corresponding to the link between the relay node and the mobile station and the second information corresponding to the link between the another relay node and the another mobile station. The method may further include determining that the link between the another relay node and the another mobile station may interfere with the link between the relay node and the mobile station based on the first information corresponding to the link between the relay node and the mobile station and the second information corresponding to the link between the another relay node and the another mobile station.

The method may further include modifying resources used to communicate with the mobile station based on the determination that the link between the another relay node and the another mobile station may interfere with the link between the relay node and the mobile station.

BRIEF DESCRIPTION OF DRAWINGS

FIG. 3 is an explanatory view showing an example of resource allocation in the case of using different frequencies in UL and DL.

FIG. 21 is an explanatory view showing an overview of a small-to-medium-sized base station.

FIG. 28 is an explanatory view showing a sequence for a plurality of small-to-medium-sized base stations to exchange information.

DESCRIPTION OF EMBODIMENTS

Figure 1:
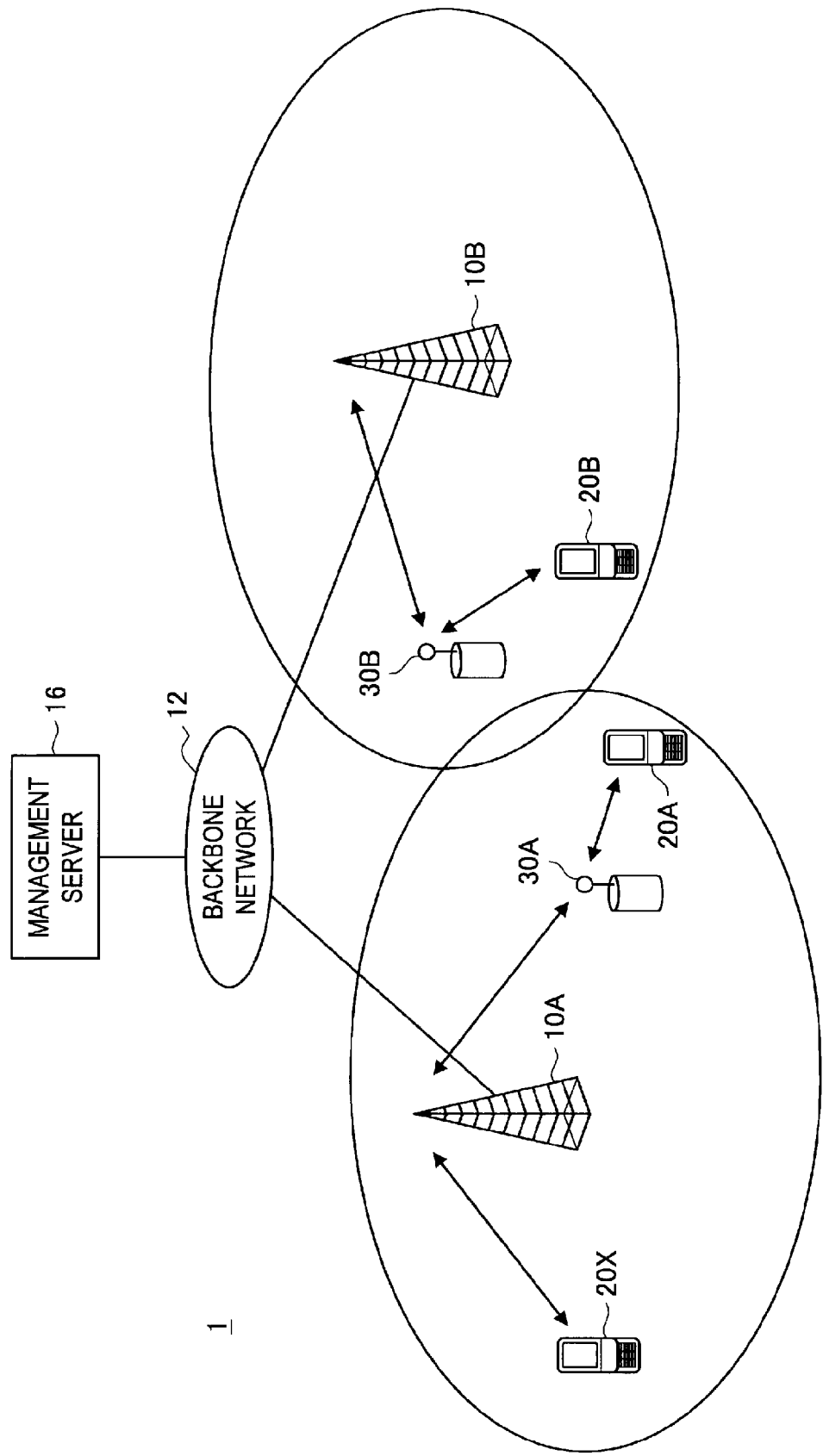
FIG. 1 is an explanatory view showing a configuration of the communication system 1 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, each of a plurality of structural elements having substantially the same function is distinguished by affixing a different alphabetical letter to the same reference numeral in some cases. For example, a plurality of structural elements having substantially the same function are distinguished like user equipments 20A, 20B and 20C where necessary. However, when there is no particular need to distinguish between a plurality of structural elements having the same function, they are denoted by the same reference numeral. For example, when there is no particular need to distinguish between the user equipments 20A, 20B and 20C, they are referred to simply as the user equipment 20.

Preferred embodiments of the present invention will be described hereinafter in the following order.

1. Basic Configuration of Communication System
(Example of Resource Allocation to Each Link)
(Example of Format of Radio Frame)
(Connection Processing Sequence)
(MBSFN)
(Example of Frequency Allocation to Each Cell)
2. First Embodiment
(Configuration of User Equipment)
(Configuration of Relay Node)
(Configuration of Base Station)
(Configuration of Management Server)
(Operation of First Embodiment)
3. Second Embodiment
(Configuration of Relay Node)
4. Other Applications of Invention
5. Summary 1. Basic Configuration of Communication System A basic configuration of a communication system 1 according to an embodiment of the present invention is described hereinafter with reference to FIGS. 1 to 8. FIG. 1 is an explanatory view showing a configuration of the communication system 1 according to an embodiment of the present invention. Referring to FIG. 1, the communication system 1 according to the embodiment of the present invention includes base stations 10A and 10B, a backbone network 12, user equipments 20A, 20B and 20X, and relay nodes 30A and 30B.

The base station 10 manages communication between the relay node 30 and the user equipment 20 located inside a cell formed by the base station 10. For example, the base station 10A manages scheduling information for communication with the user equipment 20X located inside the cell, and communicates with the user equipment 20X according to the scheduling information. Further, the base station 10A manages scheduling information for communication with the relay node 30A located inside the cell and scheduling information for communication between the relay node 30A and the user equipment 20A.

Note that management of the scheduling information may be performed in co-operation by the base station 10 and the relay node 30, may be performed in co-operation by the base station 10, the relay node 30 and the user equipment 20, or may be performed by the relay node 30.

The relay node 30 relays communication between the base station 10 and the user equipment 20 according to the scheduling information managed by the base station 10. Specifically, the relay node 30 receives a signal transmitted from the base station 10 and transmits the amplified signal to the user equipment 20 by using frequency/time according to the scheduling information in the downlink. With such a relay in the relay node 30, a signal-to-noise ratio is higher compared to directly transmitting a signal from the base station 10 to the user equipment 20 near the cell edge.

Likewise, in the uplink also, the relay node 30 relays a signal transmitted from the user equipment 20 to the base station 10 according to the scheduling information managed by the base station 10, thereby maintaining a high signal-to-noise ratio. Although the case where only the relay node 30A exists in the cell formed by the base station 10A, a plurality of relay nodes 30 may exist in the cell formed by the base station 10A.

Proposed as the types of the relay nodes 30 are Type 1 and Type 2. The relay node 30 of Type 1 has an individual cell ID and is allowed to manage its own cell. Thus, the relay node 30 of Type 1 operates in such a way that it is recognized as the base station 10 by the user equipment 20. However, the relay node 30 of Type 1 does not completely operate autonomously, and the relay node 30 performs relay communication within the range of resources allocated by the base station 10.

On the other hand, the relay node 30 of Type 2, differently from Type 1, does not have an individual cell ID and supports direct communication between the base station 10 and the user equipment 20. For example, a relay transmission technique using co-operative relay or network coding is being studied. The following table 1 shows characteristics of Type 1 and Type 2 under study.

TABLE 1

| Item | Type 1 | Type 2 |
|---|---|---|
| Decision | R1-091098 | R1-091632 |
| Type of Relay | L2 and L3 Relay | L2 |
| PHY Cell ID | Own cell ID | No cell ID |
| Transparency | Non transparent Relay node to UE | Transparent Relay node to UE |
| New cell | Create new cell (another eNB) | Not create new cell |
| RF parameters | Optimized parameters | N/A |
| HO | Inter cell HO (generic HO) | HO transparently to UE |
| Control Channel Generation | Generate synch. channel, RS, H-ARQ channel and scheduling information etc. | Not generate its own channel but decodes/forwards donor eNB's signal to UE |
| Backward compatibility | Support (appear as a Rel-8 eNB to Rel-8 UE) | Support (able to relay also to/from Rel-8 UE) |
| LTE-A (Forward compatibility) | Support (it appear differently than Rel-8 eNB to LTE-A UE) | — |
| Awareness to MS | — (>Rel-8 eNB to LTE-A UEs or Relay) | — |
| Cooperation | Inter cell cooperation | Intra cell cooperation |
| Backhaul utilization | Higher | Lower |
| Usage model | Coverage extension | Throughput enhancement and coverage extension |
| Cost | Higher | Lower |

The user equipment 20 communicates with the base station 10 directly or through the relay node 30 according to the scheduling information managed by the base station 10. Data transmitted or received by the user equipment 20 may be voice data, music data such as music, lectures or radio programs static image data such as photographs, documents, pictures or charts, or video data such as movies, television programs, video programs, game images or the like. Further, the user equipment 20 may be an information processing device having a radio communication function such as a mobile phone or a personal computer (PC).

A management server 16 is connected to each base station 10 through the backbone network 12. The management server 16 functions as a mobile management entity (MME). Further, the management server 16 may function as a serving gateway. The management server 16 receives management information indicating the status of cell formed by each base station 10 from the respective base stations 10 and controls communication in the cell formed by each base station 10 based on the management information. The function of the management server 16 may be incorporated into a plurality of physically separated structures in a distributed manner.

Example of Resource Allocation to Each Link

Resource allocation to each link is described hereinafter. In the following description, a communication path between the base station 10 and the relay node 30 is referred to as a relay link, a communication path between the relay node 30 and the user equipment 20 is referred to as an access link, and a direct communication path between the base station 10 and the user equipment 20 is referred to as a direct link. Further, a communication path toward the base station 10 is referred to as UL (uplink), and a communication path toward the user equipment 20 is referred to as DL (downlink). Communication in each link is based on OFDMA.

The relay node 30 separates the relay link and the access link by frequency or time in order to avoid interference between the relay link and the access link. For example, the relay node 30 may separate the relay link and the access link in the same direction by TDD (Time Division Duplexing) with use of a common frequency.

Figure 2:
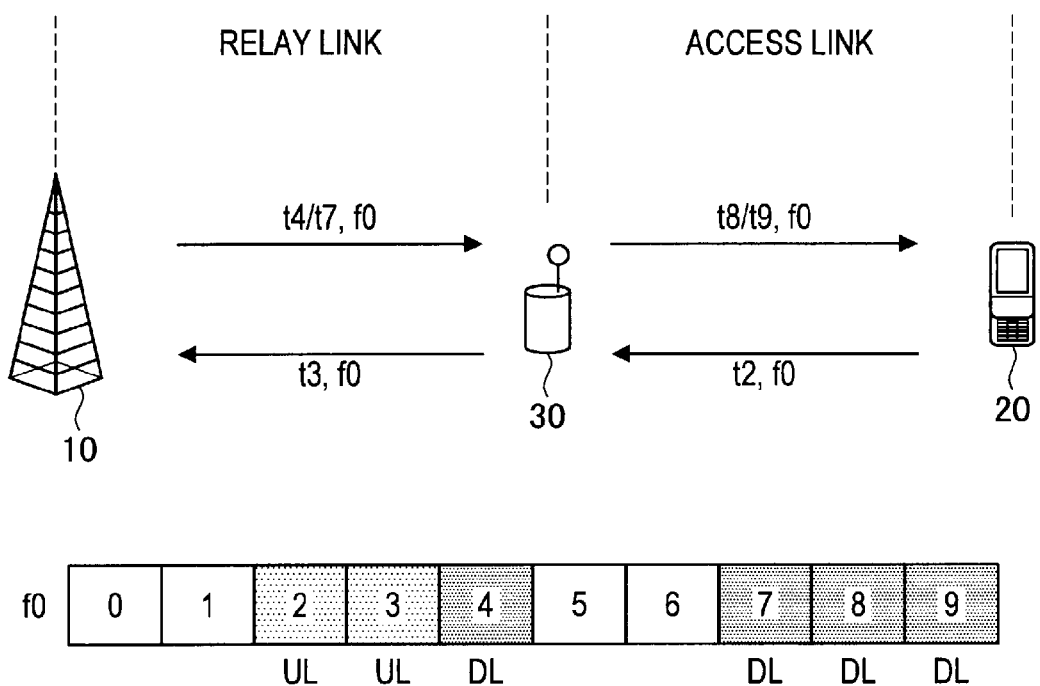
FIG. 2 is an explanatory view showing an example of resource allocation in the case of using the same frequency in UL and DL.

FIG. 2 is an explanatory view showing an example of resource allocation in the case of using the same frequency in UL and DL. Referring to FIG. 2, one radio frame is made up of subframes 0 to 9. Further, in the example shown in FIG. 2, the relay node 30 recognizes the subframes 8 and 9 as resources for DL of the access link according to a direction from the base station 10 and therefore relays a signal transmitted from the base station 10 to the user equipment 20 with use of the subframes 8 and 9.

Note that PSC (Primary Synchronization Channel) and SSC (Secondary Synchronization Channel), which are synchronous signals of the downlink, or PBCH (Physical Broadcast CHannel) is allocated to the subframes 0 and 5. Further, a paging channel is allocated to the subframes 1 and 6.

FIG. 3 is an explanatory view showing an example of resource allocation in the case of using different frequencies in UL and DL. Referring to FIG. 3, a frequency f0 is used for DL, and a frequency f1 is used for UL. Further, in the example shown in FIG. 3, the relay node 30 recognizes the subframes 6 to 8 of the frequency f0 as resources for DL of the access link according to a direction from the base station 10 and therefore relays a signal transmitted from the base station 10 to the user equipment 20 with use of the subframes 6 to 8 of the frequency f0.

Note that PSC and SSC, which are synchronous signals of the downlink, are allocated to the subframes 0 and 5 of the frequency f0 (for DL), and a paging channel is allocated to the subframes 4 and 9.

Example of Format of Radio Frame

Detailed examples of the frame format of DL radio frame and UL radio frame are described hereinafter with reference to FIGS. 4 and 5.

Figure 4:
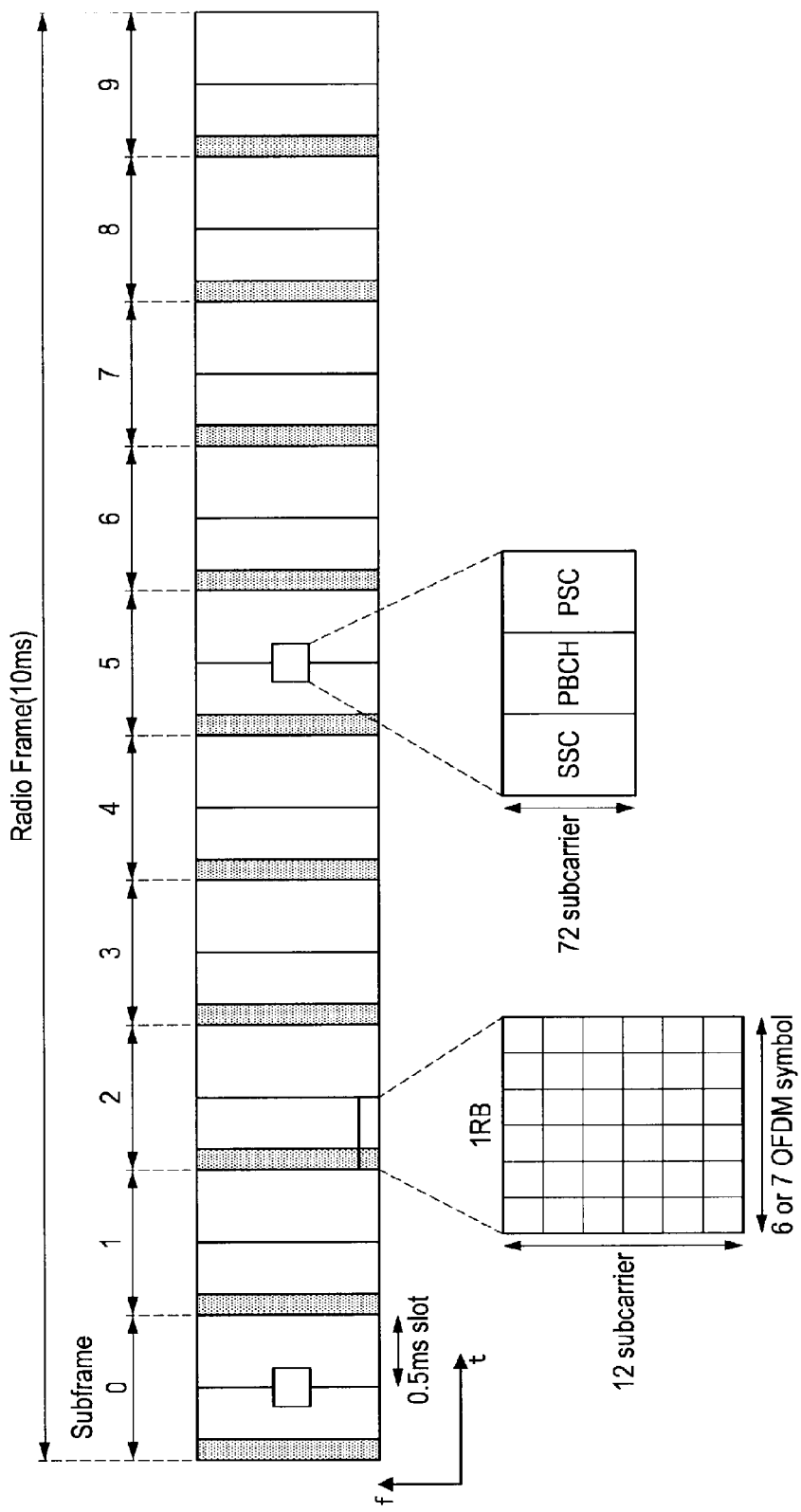
FIG. 4 is an explanatory view showing an example of a format of DL radio frame.

FIG. 4 is an explanatory view showing an example of the format of DL radio frame. The DL radio frame is made up of subframes 0 to 9, each subframe is made up of two 0.5 ms slots, and each 0.5 ms slot is made up of seven OFDM (Orthogonal Frequency Division Multiplexing) symbols.

As shown in FIG. 4, a control channel such as PCFICH (Physical Control Format Indicator CHannel), PHICH (Physical Hybrid ARQ Indicator CHannel) or PDCCH (Physical Downlink Control CHannel) is present in the first to third OFDM symbols at the head of each subframe.

Each of the above channels contains the following information as an example.

PCFICH: The number of symbols of PDCCH related to Layer 1 and Layer 2

PHICH: ACK/NACK for PUSCH

PDCCH: Downlink control information. Scheduling information (format such as modulation scheme or coding rate) of PDSCH/PUSCH Further, one resource block (1RB), which is a minimum unit of resource allocation, is made up of six or seven OFDM symbols and 12 subcarriers. A demodulation reference (reference signal) is present in a part of the resource block.

Further, SSC, PBCH and PSC are present in the subframes 0 and 5. A free space in the radio frame shown in FIG. 4 is used as PDSCH (Physical Downlink Shared CHannel).

Figure 5:
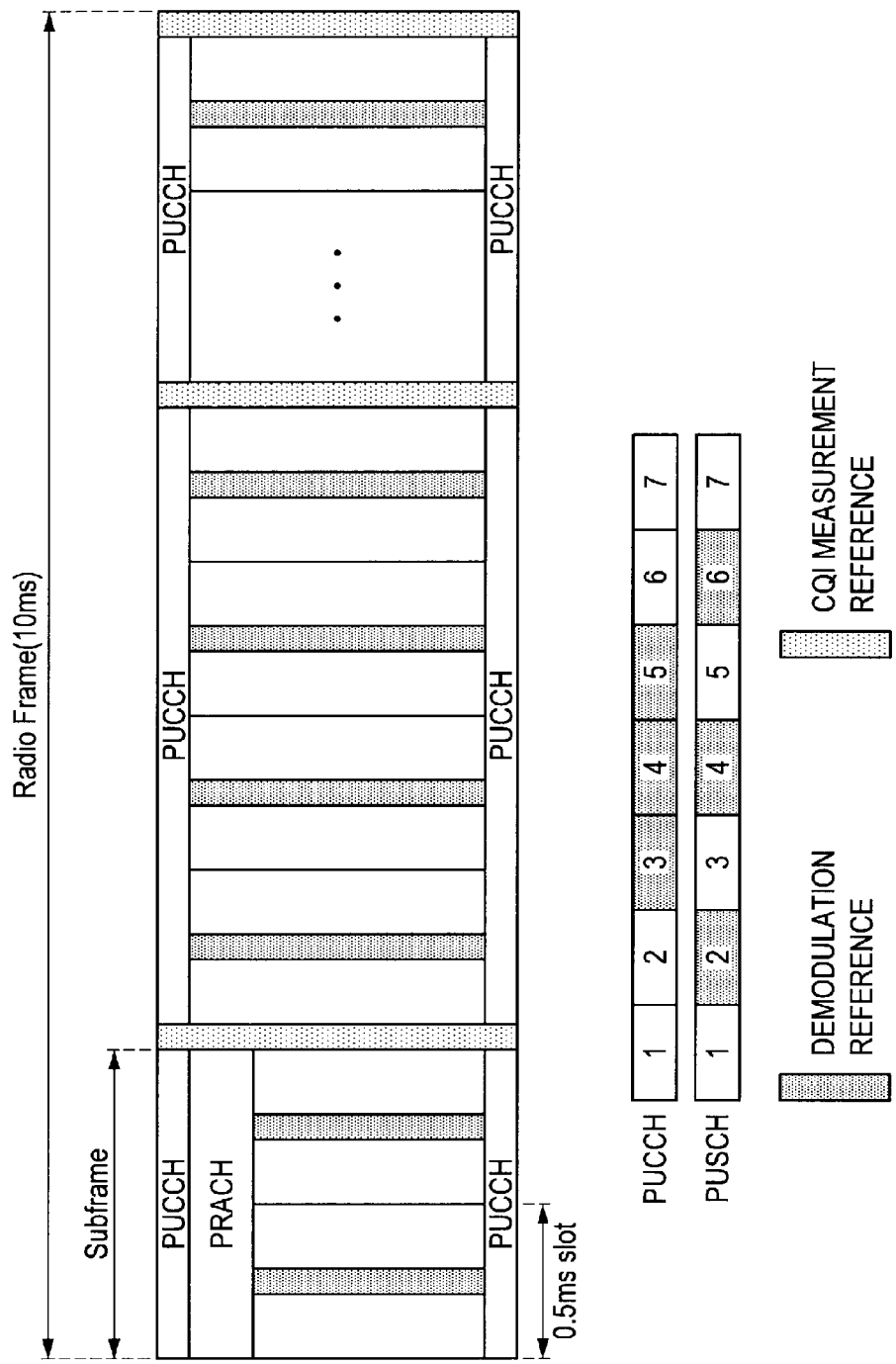
FIG. 5 is an explanatory view showing an example of a format of UL radio frame.

FIG. 5 is an explanatory view showing an example of the format of UL radio frame. Like the DL radio frame, the UL radio frame is made up of subframes 0 to 9, each subframe is made up of two 0.5 ms slots, and each 0.5 ms slot is made up of seven OFDM symbols.

As shown in FIG. 5, a demodulation reference (reference signal) is present in each of the 0.5 ms slots, and a CQI measurement reference is present in a distributed manner. The base station 10 or the relay node 30 at the receiving end performs channel estimation by using the demodulation reference and demodulates a received signal according to the channel estimation result. Further, the base station 10 or the relay node 30 at the receiving end measures the CQI measurement reference and thereby acquires CQI with the relay node 30 or the user equipment 20 at the transmitting end.

Further, a free space in the radio frame shown in FIG. 5 is used as PUSCH (Physical Uplink Shared CHannel). Note that, upon receiving a request for CQI report, the user equipment 20 or the relay node 30 transmits the CQI report by using PUSCH.

Connection Processing Sequence

A connection processing sequence between the relay node 30 or the user equipment 20 and the base station 10 is described hereinafter with reference to FIG. 6.

Figure 6:
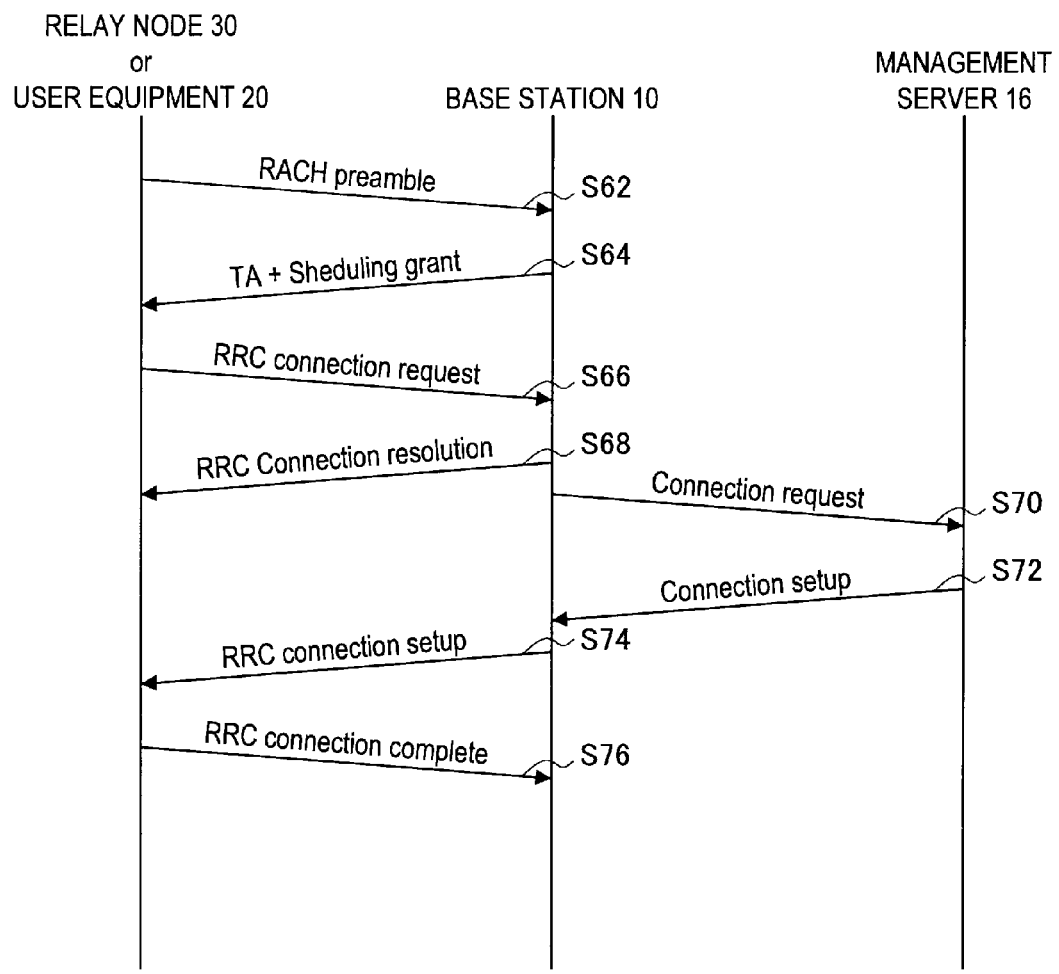
FIG. 6 is an explanatory view showing a connection processing sequence.

FIG. 6 is an explanatory view showing a connection processing sequence. Referring to FIG. 6, the relay node 30 or the user equipment 20 transmits RACH (Random Access CHannel) preamble to the base station 10 (S62). Receiving the RACH preamble, the base station 10 acquires TA (Timing Advance) information and transmits the TA information together with allocated resource information to the relay node 30 or the user equipment 20 (S64). For example, in the case where the transmission timing of the RACH preamble is known, the base station 10 may acquire a difference between the transmission timing and the reception timing of the RACH preamble as the TA information.

After that, the relay node 30 or the user equipment 20 transmits RRC connection request to the base station 10 by using resources indicated by the allocated resource information (S66). Receiving the RRC connection request, the base station 10 transmits RRC connection resolution indicating a transmission source of the RRC connection request (S68). The relay node 30 or the user equipment 20 can thereby confirm whether the base station 10 has received the RRC connection request.

Then, the base station 10 transmits connection request indicating that the relay node 30 or the user equipment 20 is making a request for service to the management server 16 that functions as MME (S70). Receiving the connection request, the management server 16 transmits information to be set to the relay node 30 or the user equipment 20 as connection setup (S72).

Then, the base station 10 transmits RRC connection setup to the relay node 30 or the user equipment 20 based on the connection setup from the management server 16 (S74), and the relay node 30 or the user equipment 20 makes connection setting. After that, the relay node 30 or the user equipment 20 transmits RRC connection complete indicating completion of connection setting to the base station 10 (S76).

Connection between the relay node 30 or the user equipment 20 and the base station 10 is thereby completed, and communication becomes available. The above-described connection processing sequence is just by way of illustration, and the relay node 30 or the user equipment 20 and the base station 10 may be connected by another sequence.

MBSFN

Hereinafter, MBSFN (Multimedia Broadcasting Single Frequency Network) transmission that is performed by the base station 10 and an exemplary operation of the relay node 30 in response to the MBSFN transmission are described.

MBSFN is the mode where a plurality of base stations 10 simultaneously transmits data in a broadcast manner at the same frequency. Therefore, in MBSFN, the relay node 30 of Type 1 that virtually operates as a base station transmits a control channel for DL or the like by using the same frequency as that of the base station 10. A specific flow of MBSFN transmission/reception processing is described hereinafter with reference to FIG. 7.

Figure 7:
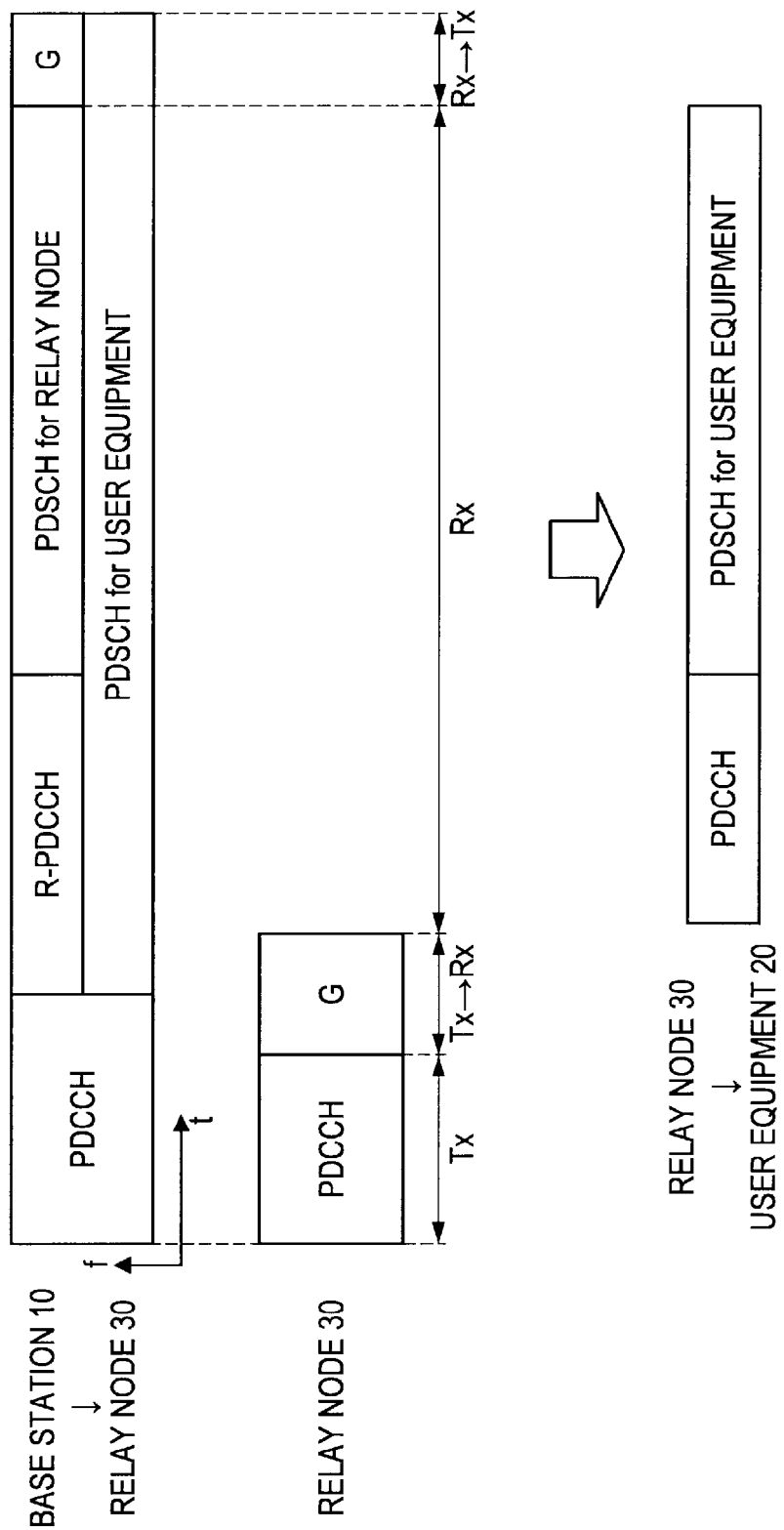
FIG. 7 is an explanatory view showing an illustrative example of MBSFN transmission/reception processing.

FIG. 7 is an explanatory view showing an illustrative example of MBSFN transmission/reception processing. First, as shown in FIG. 7, the base station 10 and the relay node 30 simultaneously transmit PDCCH. The base station 10 transmits, after PDCCH, PDSCH for the user equipment 20 and R-PDCCH for controlling a relay. After R-PDCCH, the base station 10 transmits PDSCH for the relay node 30 (relay target data). A non-transmission period comes after PDSCH for the relay node 30.

The relay node 30 receives, after transmitting PDCCH, PDSCH (relay target data) from the base station 10 subsequent to a switching period to reception processing. The relay node 30 then switches reception processing to transmission processing in the non-transmission period that comes after PDSCH (relay target data) from the base station 10. Further, in the next step, the relay node 30 adds PDCCH to decoded PDSCH (relay target data) and then transmits the data to the user equipment 20.

The existing user equipment that does not assume the existence of the relay node 30 can thereby make an advantage of the relay by the relay node 30 without confusion.

Example of Frequency Allocation to Each Cell

An example of frequency allocation to each cell in the case where a plurality of cells are adjacent is described hereinafter.

Figure 8:
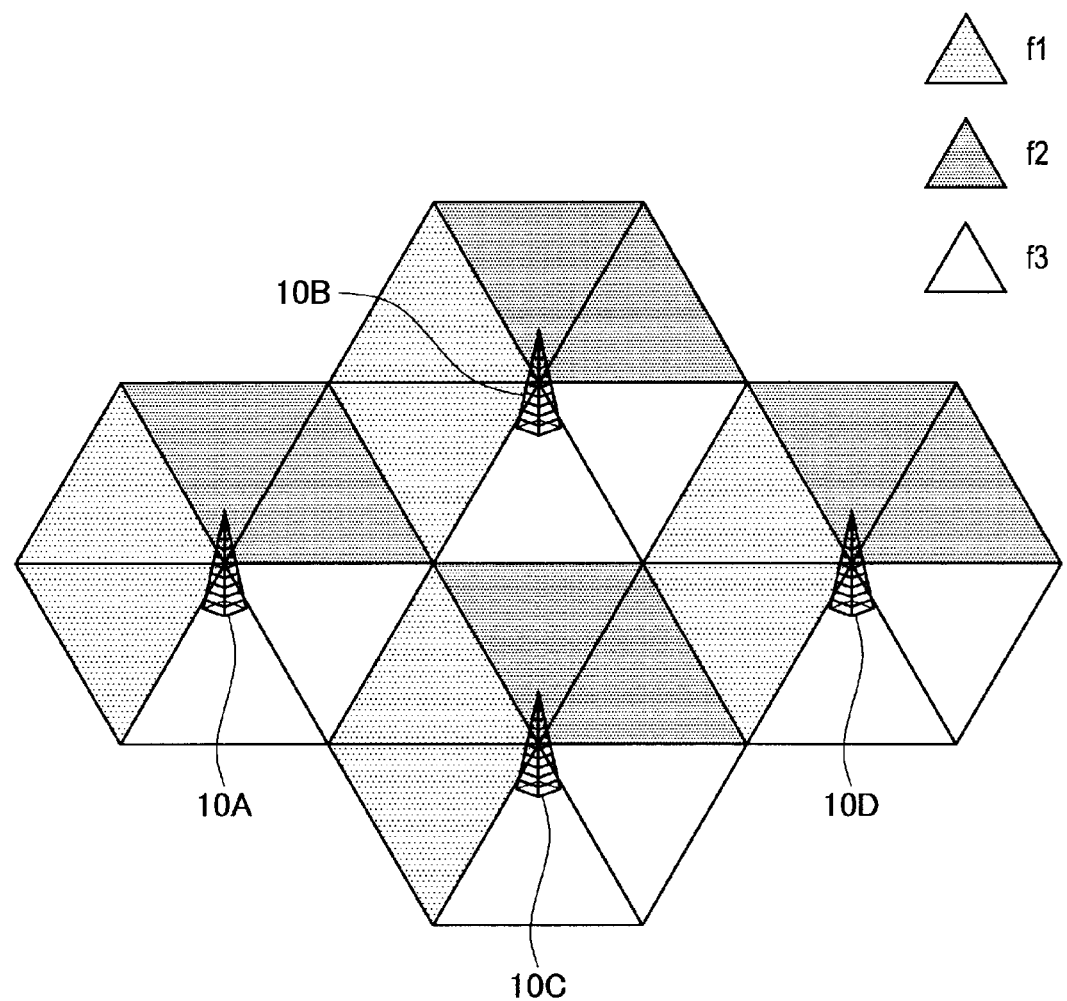
FIG. 8 is an explanatory view showing an example of frequency allocation in each cell.

FIG. 8 is an explanatory view showing an example of frequency allocation in each cell. In the case where each cell is made up of three sectors, frequencies f1 to f3 are allocated to the respective sectors as shown in FIG. 8, thereby suppressing the interference of frequencies at the cell boundary. Such allocation is particularly effective in a densely populated area with heavy traffic.

In LTE-A, in order to achieve end-to-end high-throughput, various novel techniques such as spectrum aggregation, network MIMO, uplink multi-user MIMO and relay technique are being studied. Therefore, with the advent of high-throughput novel mobile applications, there is a possibility that exhaustion of frequency resources appears as an issue in a suburban area also. Further, in the introduction of LTE-A, it is highly possible that the installation of the relay node 30 will be activated for the purpose of achieving infrastructure development at low costs.

If the relay nodes 30 belonging to different base stations 10 are located near each of the cell edges, interference between cells caused by each of relay nodes 30 will be more significant problem since the relay node 30 transmits a signal in transmission power larger than the user equipment 10.

In light of the foregoing, the first embodiment and the second embodiment of the present invention will be described as below. Each of the first embodiment and the second embodiment of the present invention includes additional features in addition to the configuration of the communication system 1 according to an embodiment of the present invention.

2. First Embodiment

Figure 9:
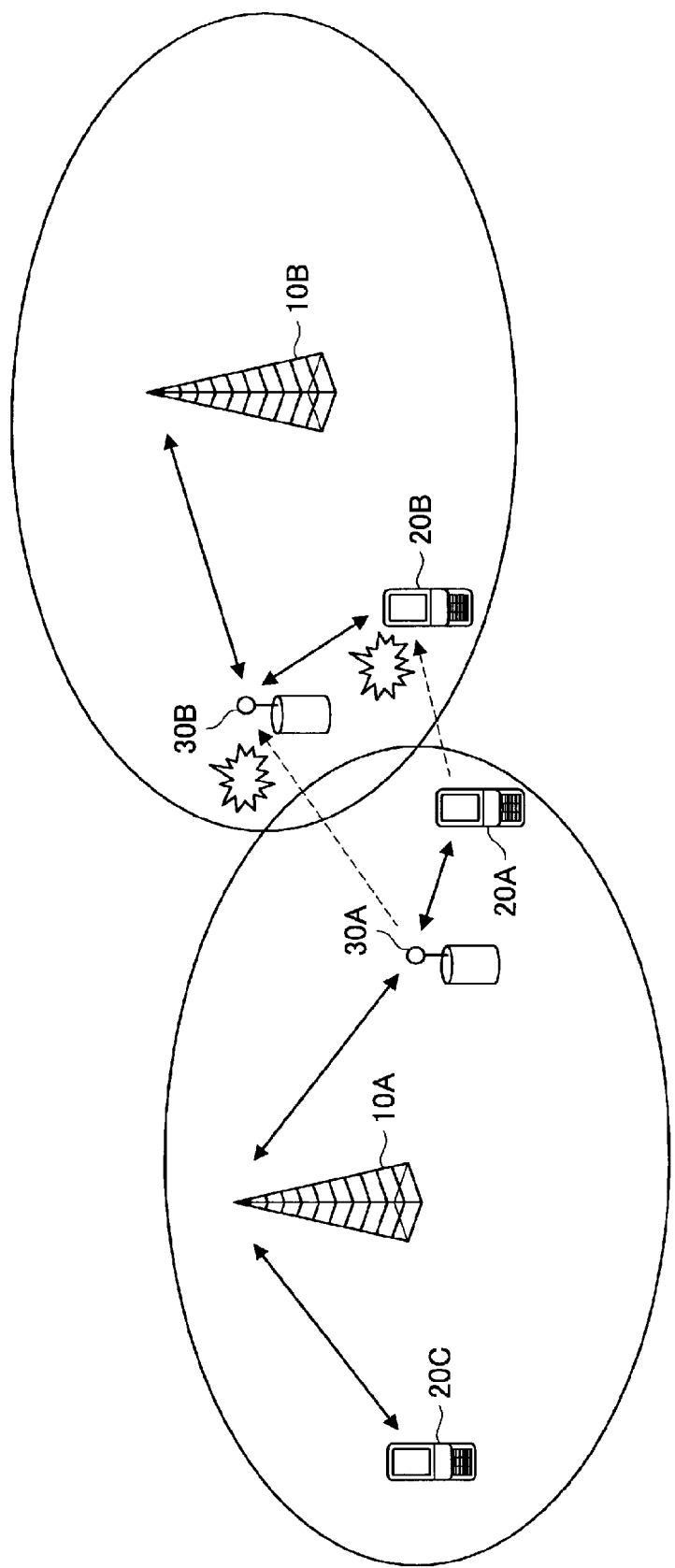
FIG. 9 is an explanatory view showing an example of a case of interference to be processed in the first embodiment of the present invention.

FIG. 9 is an explanatory view showing an example of a case of interference to be processed in the first embodiment of the present invention. As illustrated in FIG. 9, if the user equipment 20A transmits a signal to the relay node 30A through UL of the access link at the same time when the relay node 30B transmits a signal to the user equipment 20B through DL of the access link, both signals interfere in the relay node 30B.

If the relay node 30A transmits a signal to the base station 10A through UL of the relay link at the same time when the user equipment 20B transmits a signal to the relay node 30B through UL of the access link, both signals interfere in the relay node 30B.

According to the first embodiment of the present invention, it is possible that such interference regarding the relay node 30 is prevented by exchanging information held by the relay node 30A and the relay node 30B which respectively belong to different base station 10. Hereinafter, the first embodiment will be described in detail with reference to FIGS. 10 to 14.

Configuration of User Equipment

Figure 10:
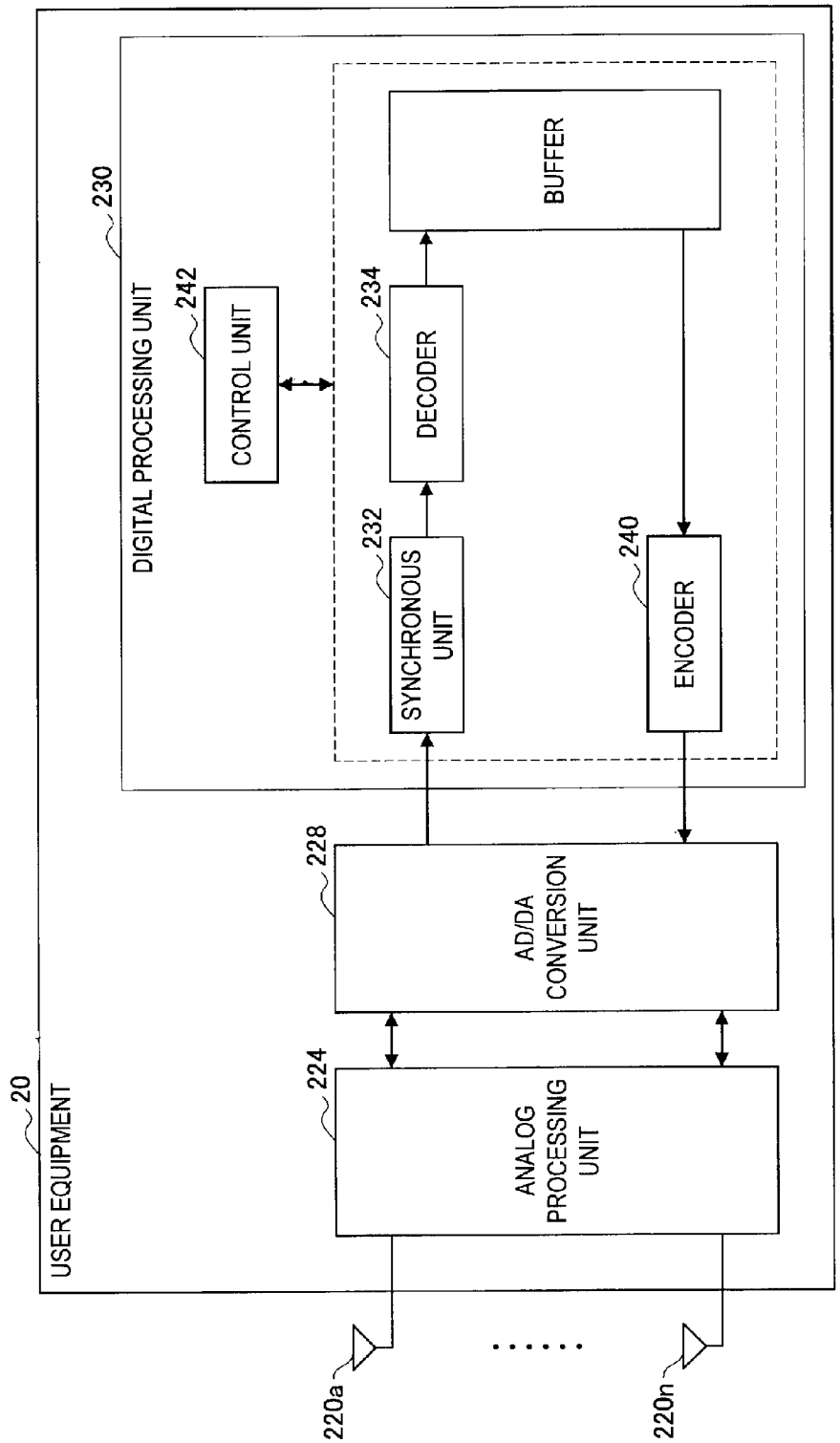
FIG. 10 is a functional block diagram showing a configuration of a user equipment 20.

FIG. 10 is a functional block diagram showing a configuration of the user equipment 20. Referring to FIG. 10, the user equipment 20 includes a plurality of antennas 220a to 220n, an analog processing unit 224, an AD/DA conversion unit 228, and a digital processing unit 230.

Each of the plurality of antennas 220a to 220n receives a radio signal from the base station 10 or the relay node 30, acquires an electrical high-frequency signal, and supplies the high-frequency signal to the analog processing unit 224. Further, each of the plurality of antennas 220a to 220n transmits a radio signal to the base station 10 or the relay node 30 based on a high-frequency signal supplied from the analog processing unit 224. With the plurality of antennas 220a to 220n, the user equipment 20 is capable of performing MIMO (Multiple-Input Multiple-Output) communication or diversity communication.

The analog processing unit 224 converts the high-frequency signal supplied from the plurality of antennas 220a to 220n into a baseband signal by performing analog processing such as amplification, filtering and down-conversion. Further, the analog processing unit 224 converts a baseband signal supplied from the AD/DA conversion unit 228 into a high-frequency signal.

The AD/DA conversion unit 228 converts the baseband signal supplied from the analog processing unit 224 from analog to digital and supplies the digital signal to the digital processing unit 230. Further, the AD/DA conversion unit 228 converts the baseband signal supplied from the digital processing unit 230 from digital to analog and supplies the analog signal to the analog processing unit 224.

The digital processing unit 230 includes a synchronous unit 232, a decoder 234, an encoder 240, and a control unit 242. The synchronous unit 232, the decoder 234, the encoder 240 and so on, together with the plurality of antennas 220a to 220n, the analog processing unit 224 and the AD/DA conversion unit 228, function as a communication unit for communicating with the base station 10 or the relay node 30.

A synchronous signal such as PSC or SSC transmitted from the base station 10 or the relay node 30 is supplied to the synchronous unit 232 from the AD/DA conversion unit 228, and the synchronous unit 232 performs synchronous processing of the radio frame based on the synchronous signal. Specifically, the synchronous unit 232 synchronizes the radio frame by calculating a correlation between the synchronous signal and a known sequence pattern and detecting a peak of the correlation.

The decoder 234 decodes the baseband signal supplied from the AD/DA conversion unit 228 and obtains received data. The decoding may include MIMO reception processing and OFDM demodulation processing, for example.

The encoder 240 encodes transmission data such as PUSCH and supplies the encoded data to the AD/DA conversion unit 228. The encoding may include MIMO transmission processing and OFDM modulation processing, for example.

The control unit 242 controls the overall operation in the user equipment 20, such as transmission processing, reception processing, and connection processing with the relay node 30 or the base station 10. For example, the user equipment 20 performs transmission processing and reception processing by using the resource block allocated by the base station 10 based on the control of the control unit 242. Note that the control unit 242 controls transmission processing in accordance with a transmission parameter specified by the base station 10 or the relay node 30. For example, when the base station 10 specifies a TPC (Transmit Power Control) parameter of the user equipment 20 by PDCCH, the control unit 242 controls transmission processing in accordance with the TPC parameter specified by the base station 10.

Further, when the base station 10 or the relay node 30 makes a request for CQI report to the user equipment 20 by PDCCH, the digital processing unit 230 measures channel quality (e.g. reception power) by using the demodulation reference transmitted from the base station 10 or the relay node 30. The control unit 242 generates CQI report based on the measurement result and supplies the generated CQI report to the encoder 240. Consequently, the CQI report is transmitted to the base station 10 or the relay node 30 by using PUSCH.

Configuration of Relay Node

A configuration of the relay node 30 is described hereinafter with reference to FIG. 11.

Figure 11:
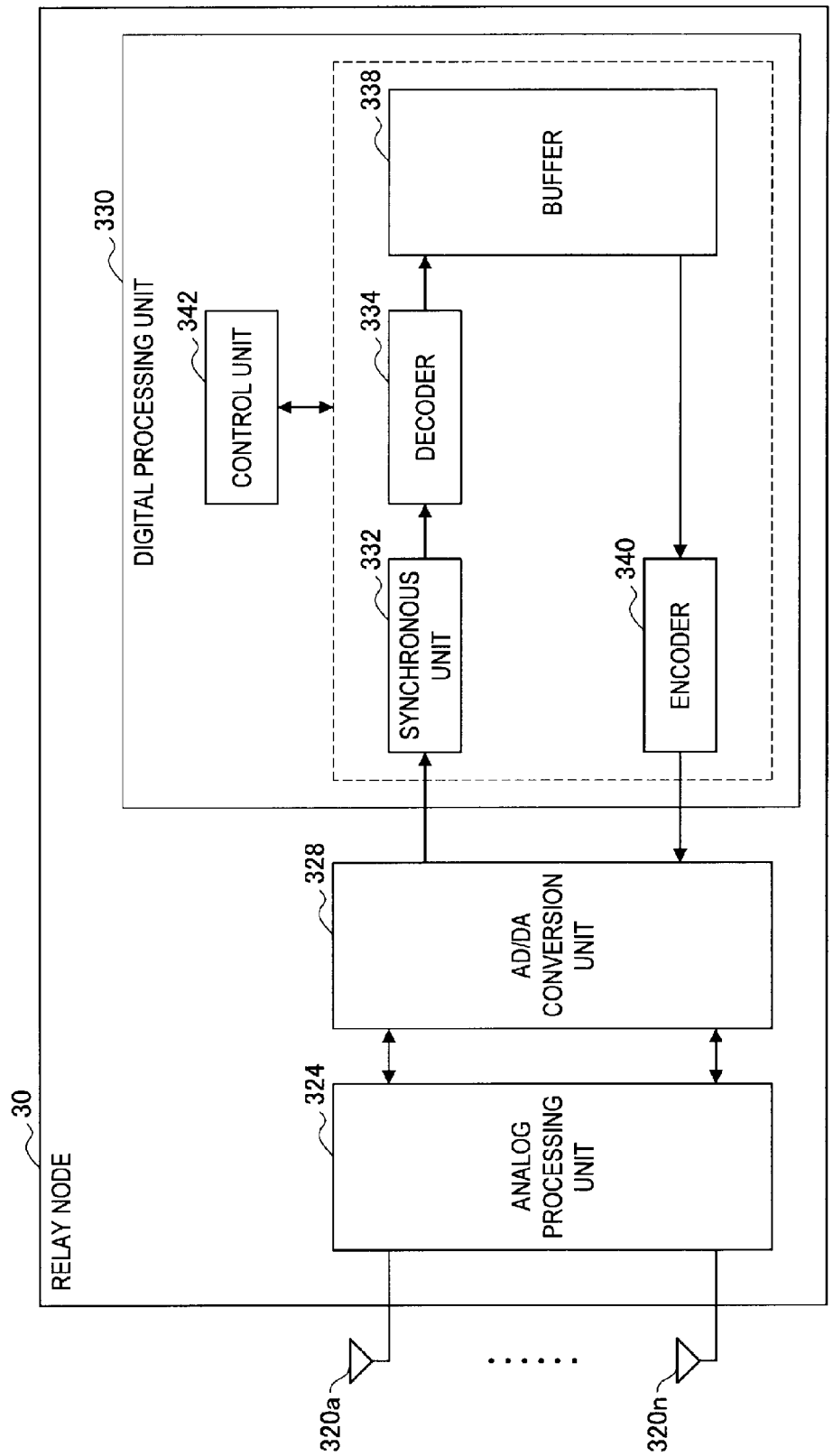
FIG. 11 is a functional block diagram showing a configuration of the relay node 30.

FIG. 11 is a functional block diagram showing a configuration of the relay node 30. Referring to FIG. 11, the relay node 30 includes a plurality of antennas 320a to 320n, an analog processing unit 324, an AD/DA conversion unit 328, and a digital processing unit 330.

Each of the plurality of antennas 320a to 320n receives a radio signal from the base station 10 or the user equipment 20, acquires an electrical high-frequency signal, and supplies the high-frequency signal to the analog processing unit 324. Further, each of the plurality of antennas 320a to 320n transmits a radio signal to the base station 10 or the user equipment 20 based on a high-frequency signal supplied from the analog processing unit 324. With the plurality of antennas 320a to 320n, the relay node 30 is capable of performing MIMO communication or diversity communication.

The analog processing unit 324 converts the high-frequency signal supplied from the plurality of antennas 320a to 320n into a baseband signal by performing analog processing such as amplification, filtering and down-conversion. Further, the analog processing unit 324 converts a baseband signal supplied from the AD/DA conversion unit 328 into a high-frequency signal.

The AD/DA conversion unit 328 converts the baseband signal supplied from the analog processing unit 324 from analog to digital and supplies the digital signal to the digital processing unit 330. Further, the AD/DA conversion unit 328 converts the baseband signal supplied from the digital processing unit 330 from digital to analog and supplies the analog signal to the analog processing unit 324.

The digital processing unit 330 includes a synchronous unit 332, a decoder 334, a buffer 338, an encoder 340, and a control unit 342. The synchronous unit 332, the decoder 334, the encoder 340 and so on, together with the plurality of antennas 320a to 320n, the analog processing unit 324 and the AD/DA conversion unit 328, function as a receiving unit, a transmitting unit, and a relay unit for communicating with the base station 10 or the user equipment 20.

A synchronous signal transmitted from the base station 10 is supplied to the synchronous unit 332 from the AD/DA conversion unit 328, and the synchronous unit 332 performs synchronous processing of the radio frame based on the synchronous signal. Specifically, the synchronous unit 332 synchronizes the radio frame by calculating a correlation between the synchronous signal and a known sequence pattern and detecting a peak of the correlation.

The decoder 334 decodes the baseband signal supplied from the AD/DA conversion unit 328 and obtains relay data with a destination to the base station 10 or the user equipment 20. The decoding may include MIMO reception processing, OFDM de-modulation processing, error correction processing and so on, for example.

The buffer 338 temporarily stores relay data with a destination to the base station 10 or the user equipment 20 which is obtained by the decoder 334. Then, by the control of the control unit 342, the relay data with a destination to the user equipment 20 is read from the buffer 338 to the encoder 340 in the resource block for DL of the access link. Likewise, by the control of the control unit 342, the relay data with a destination to the base station 10 is read from the buffer 338 to the encoder 340 in the resource block for UL of the relay link.

The encoder 340 encodes the relay data supplied from the buffer 338 and supplies the encoded data to the AD/DA conversion unit 328. The encoding may include MIMO transmission processing and OFDM modulation processing, for example.

The control unit 342 controls the overall operation in the relay node 30, such as transmission processing, reception processing, and connection processing with the base station 10 or the user equipment 20. For example, the relay node 30 performs transmission processing and reception processing by using the resource block allocated by the base station 10 based on the control of the control unit 342.

The control unit 342 controls communication to exchange information with the relay node 30B in the adjacent cell by using the resource block allocated by the management server 16. Exchanged information may be, for example, identification information of the user equipment 20 belonging to each of the relay nodes 30, scheduling information, an allowable interference level, CQI information, Qos information, information related to the position or the like. The information related to the position may contain position information acquired by GPS, TA information indicating the distance between the user equipment 20 and the relay node 30, or information indicating the direction of the user equipment 20. The direction of the user equipment 20 can be acquired by algorithm estimating the arrival direction of a signal transmitted from the user equipment 20 or performing directional reception.

Further, the control unit 342 does not necessarily need to control communication to exchange information with the adjacent relay node 30B by using the resource block mentioned above if a specific logical identifier is added to the resource information indicating the resource block allocated by the management server 16. For example, the control unit 342 may control communication to exchange information as needed or temporarily.

Further, the control unit 342 may control to avoid interference with the adjacent cells based on the exchanged information. For example, if the control unit 342 refers to scheduling information of the relay node 30B and if there is a resource block that overlaps in time-frequency with the scheduling information of the relay node 30, the control unit 342 may change the use of the resource block. The relay node 30 may also transmit the exchanged information to the base station 10, and the base station 10 may control to avoid interference.

Configuration of Base Station

Figure 12:
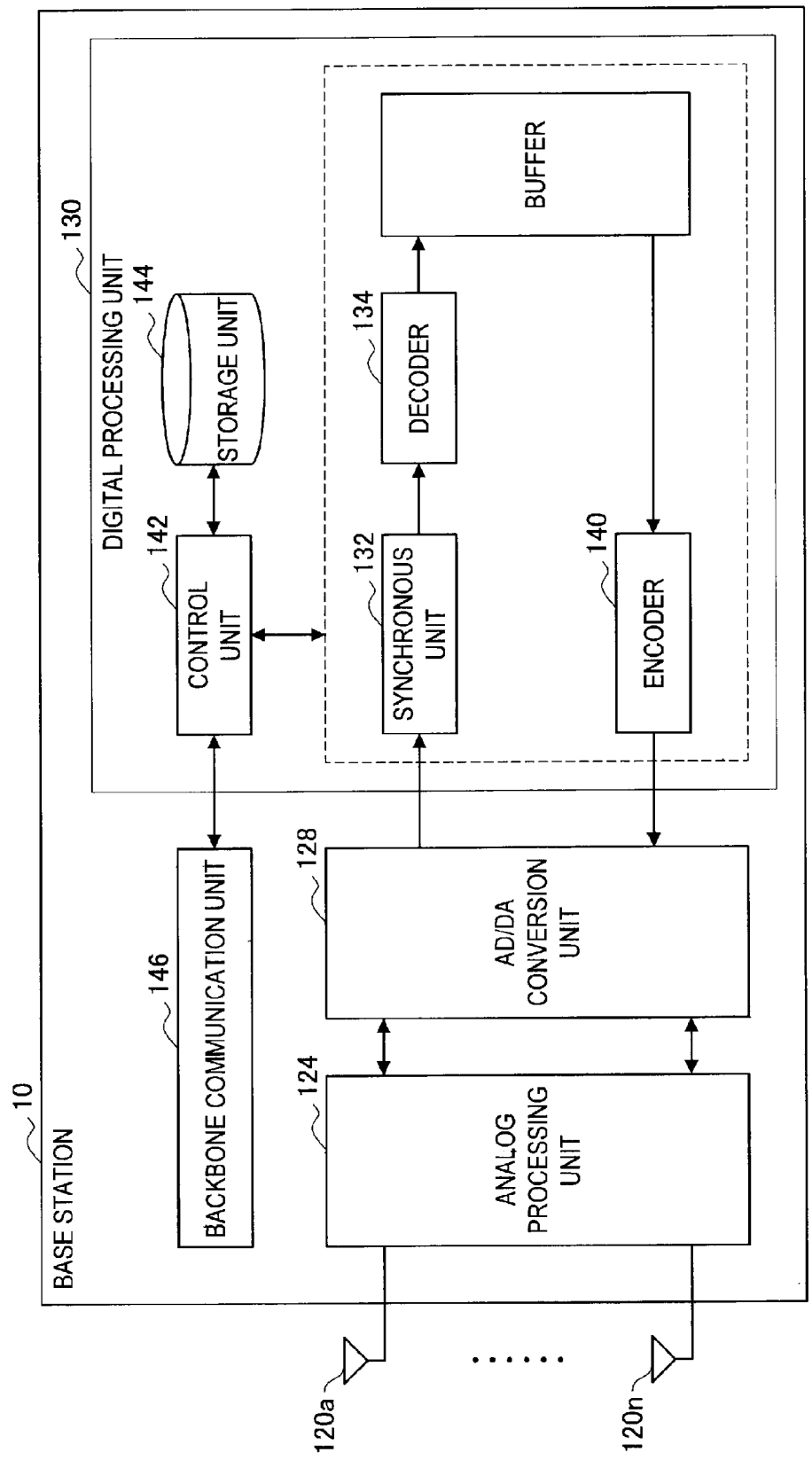
FIG. 12 is a functional block diagram showing a configuration of the base station 10.

FIG. 12 is a functional block diagram showing a configuration of the base station 10. Referring to FIG. 12, the base station 10 includes a plurality of antennas 120a to 120n, an analog processing unit 124, an AD/DA conversion unit 128, a digital processing unit 130, and a backbone communication unit 146.

Each of the plurality of antennas 120a to 120n receives a radio signal from the relay node 30 or the user equipment 20, acquires an electrical high-frequency signal, and supplies the high-frequency signal to the analog processing unit 124. Further, each of the plurality of antennas 120a to 120n transmits a radio signal to the relay node 30 or the user equipment 20 based on a high-frequency signal supplied from the analog processing unit 124. With the plurality of antennas 120a to 120n, the base station 10 is capable of performing MIMO communication or diversity communication.

The analog processing unit 124 converts the high-frequency signal supplied from the plurality of antennas 120a to 120n into a baseband signal by performing analog processing such as amplification, filtering and down-conversion. Further, the analog processing unit 124 converts a baseband signal supplied from the AD/DA conversion unit 128 into a high-frequency signal.

The AD/DA conversion unit 128 converts the baseband signal supplied from the analog processing unit 124 from analog to digital and supplies the digital signal to the digital processing unit 130. Further, the AD/DA conversion unit 128 converts the baseband signal supplied from the digital processing unit 130 from digital to analog and supplies the analog signal to the analog processing unit 124.

The digital processing unit 130 includes a synchronous unit 132, a decoder 134, an encoder 140, a control unit 142, and a storage unit 144. The synchronous unit 132, the decoder 134, the encoder 140 and so on, together with the plurality of antennas 120a to 120n, the analog processing unit 124 and the AD/DA conversion unit 128, function as a communication unit for communicating with the relay node 30 or the user equipment 20.

A synchronous signal transmitted from the user equipment 20 or the relay node 30 is supplied to the synchronous unit 132 from the AD/DA conversion unit 128, and the synchronous unit 132 performs synchronous processing of the radio frame based on the synchronous signal. The decoder 134 decodes the baseband signal supplied from the AD/DA conversion unit 128 and obtains received data. The decoding may include MIMO reception processing, OFDM demodulation processing, error correction processing and so on, for example.

The encoder 140 encodes PDSCH, for example, and supplies the encoded PDSCH to the AD/DA conversion unit 128. The encoding may include MIMO transmission processing and OFDM modulation processing, for example.

The control unit 142 controls the overall operation in the base station 10, such as transmission processing, reception processing, connection processing with the relay node 30 or the user equipment 20, and management of scheduling information. For example, the control unit 142 makes scheduling of relay link communication between the base station 10 and the relay node 30 and access link communication between the relay node 30 and the user equipment 20.

Further, the control unit 142 stores management information indicating the status of the cell formed by the base station 10 into the storage unit 144. An example of the management information is as follows.

(1) Information related to the position of each relay node 30 and each user equipment 20 belonging to the base station 10

(2) ID, Qos class and scheduling information of each relay node 30 and each user equipment 20 belonging to the base station 10

(3) Communication quality information (e.g. CQI information, TPC information, or both) of each relay link and each access link (4) Allowable interference level (e.g. a necessary SNIR at the minimum rate) of each user equipment 20 belonging to the base station 10

The backbone communication unit 146 communicates with the management server 16 through the backbone network 12. For example, the backbone communication unit 146 transmits information described in the above (1) to (4) stored in the storage unit 144 to the management server 16. At that time, regarding the above (2), the backbone communication unit 146 may further transmit reference counter information for detecting a deviation of synchronization between the base station 10 and another base station in consideration of the case where the base station 10 and another base station operate in an asynchronous manner.

Configuration of Management Server

Figure 13:
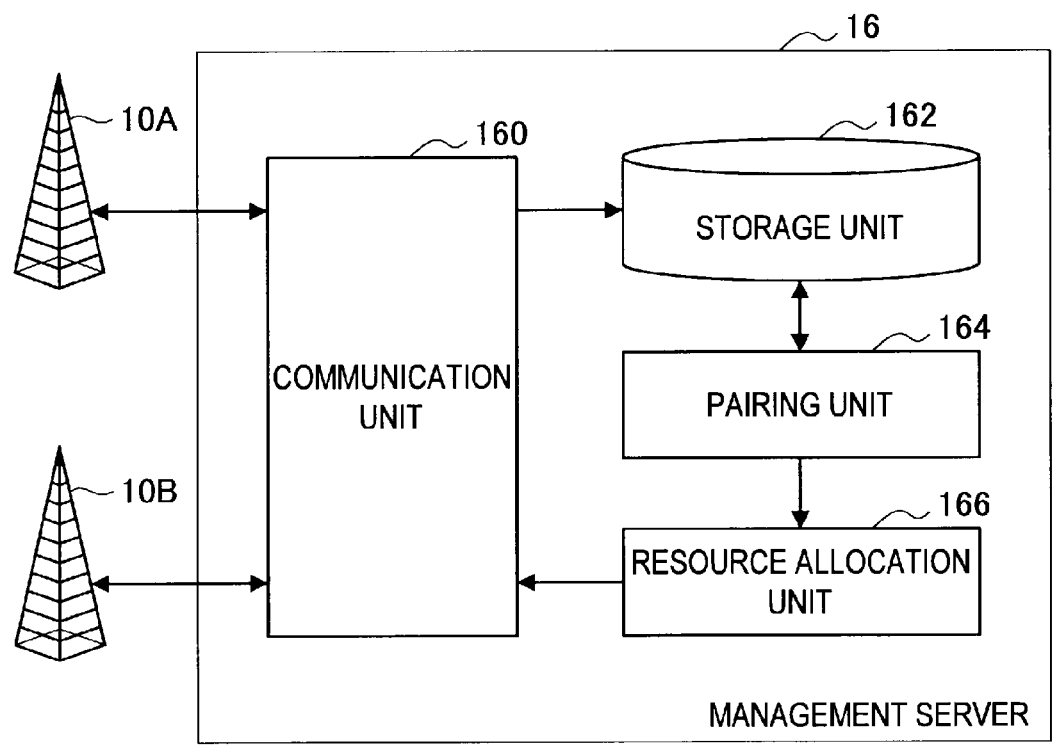
FIG. 13 is a functional block diagram showing a configuration of the management server 16.

FIG. 13 is a functional block diagram showing a configuration of the management server 16. Referring to FIG. 13, the management server 16 includes a communication unit 160, a storage unit 162, a pairing unit 164, and a resource allocation unit 166.

The communication unit 160 is connected to each base station 10 and has functions of a receiving unit that receives information from each base station 10 and a transmitting unit that transmits information to each base station 10. For example, the communication unit 160 receives the management information described in the above (1) to (4) from each base station 10. The management information received by the communication unit 160 is stored in the storage unit 162.

The pairing unit 164 (selection unit) pairs two relay nodes 30 to exchange information with each other by using part or all of the management information described in the above (1) to (4). Specifically, the pairing unit 164 may pair the two relay nodes 30 which belong to different base stations 10 and are likely to cause interference with each other. If the communication quality of a certain link does not satisfy a given criterion (e.g. an allowable interference level), interference is likely to occur in the link. To avoid this, the pairing unit 164 may pair the relay node 30 related to the link whose communication quality does not satisfy a given criterion and the relay node 30 in closest proximity to that relay node 30.

Further, the pairing unit 164 may pair the two relay nodes 30 where the user equipment 20 belonging the respective relay nodes 30 are in close proximity to each other. Furthermore, the pairing unit 164 may pair the two relay nodes 30 spaced at a predetermined distance or less. Furthermore, the pairing unit 164 may pair the two relay nodes 30 which use resource blocks overlap in time-frequency.

Note that it is a condition to pair two relay nodes 30 that the two relay nodes 30 to be paired can obtain resources for information exchange. Further, when there is no relay nodes 30 that are likely to interfere with each other, or when resources for information exchange are not obtainable, the pairing unit 164 does not perform pairing and attempts to avoid interference by another way.

The resource allocation unit 166 allocates a resource block for the two paired relay nodes 30 to exchange information. For example, the resource allocation unit 166 allocates a resource block to DL of the access link for the relay node 30 at the transmitting end of information and allocates a resource block to UL of the access link for the relay node 30 at the receiving end of information. Alternatively, the resource allocation unit 166 may allocate a resource block for UL of the relay link to the relay node 30 at the transmitting end of information and allocate a resource block for DL of the relay link to the relay node 30 at the receiving end of information.

Further, the resource allocation unit 166 may allocate a resource block to function as the receiving end and a resource block to function as the transmitting end to both of the two relay nodes 30. The two relay nodes 30 can thereby exchange information bidirectionally.

Note that, when the two paired relay nodes 30 are asynchronous, the resource allocation unit 166 may allocate a resource block in such a way that the resource blocks allocated to the respective relay nodes 30 correspond in time.

On the other hand, when the base stations 10 to which the two paired relay nodes 30 respectively belong are synchronous and they operate in MBSFN with the relay nodes 30 belonging thereto, the resource allocation unit 166 may allocate a resource block for DL of the access link to the relay node 30 at the transmitting end of information and allocate a resource bock for UL of the access link to the relay node 30 at the receiving end of information. Further, the resource allocation unit 166 may allocate a resource block to function as the receiving end and a resource block to function as the transmitting end to both of the two relay nodes 30. The two relay nodes 30 can thereby exchange information bidirectionally.

After the resource block is allocated by the resource allocation unit 166 in the above manner, the communication unit 160 transmits resource information indicating the allocated resource block to the base stations 10 to which the two paired relay nodes 30 respectively belong. Further, each base station 10 transmits the resource information received from the management server 16 to the corresponding relay node 30 by using PDCCH, for example.

As a result, the relay nodes 30 that belong to the different base stations 10 can exchange information directly by using the resource block allocated by the management server 16. Because the direct information exchange enables reduction of delay time compared to information exchange performed by the base stations 10 through the backbone network 12, it is possible to achieve the operation for avoiding interference speedily according to a change in communication status.

Operation of First Embodiment

The configurations of the relay node 30, the management server 16 and so on according to the first embodiment of the present invention are described above with reference to FIGS. 9 to 13. Hereinafter, the operation according to the first embodiment of the present invention is described with reference to FIG. 14. The embodiment is based on the following premises.

The relay node 30 uses the direct link and ends the step up to RRC connection complete in the same procedure as the user equipment 20, and sub-cell ID, reference pattern allocation and so on are already determined.
 The base station 10 and the relay node 30 belonging thereto are in synchronization.
 Grouping information indicating the relay node 30 and the user equipment 20 belonging to the relay node 30 is supplied in advance from the base station 10 (the base station 10 determines the necessity of relay based on CQI report or TA information and allocates resources for relay when necessary).
 Ptx_DL>>Ptx_RL, Ptx_AL (Ptx: maximum transmission power)
 measures against interference to the direct link, particularly the direct link of a use equipment (LTE UE) that does not assume the existence of the relay node 30, are considered to be an important issue.

Figure 14:
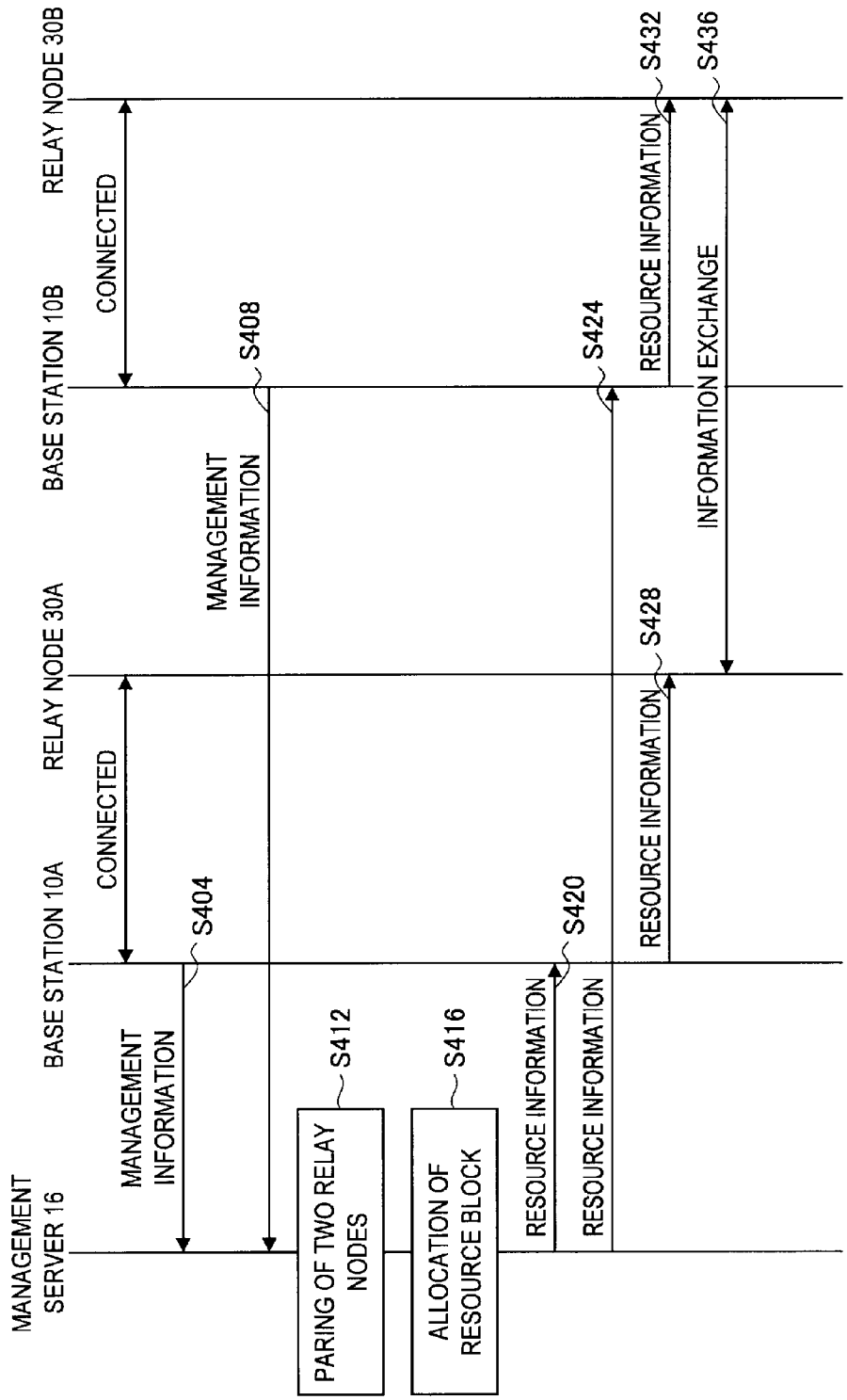
FIG. 14 is a sequence chart showing an operation by the first embodiment of the present invention.

FIG. 14 is a sequence chart showing the operation according to the first embodiment of the present invention. In the example shown in FIG. 14, the relay node 30A and the base station 10A are connected, and the relay node 30B and the base station 10B are connected. In this case, the base station 10A transmits management information indicating the status of the cell formed by the base station 10A to the management server 16 (S404). Likewise, the base station 10B transmits management information indicating the status of the cell formed by the base station 10B to the management server 16 (S408).

After that, the pairing unit 164 of the management server 16 pairs the two relay nodes 30 that are likely to cause interference with each other based on the management information received from each base station 10 (S412). The resource allocation unit 166 of the management server 16 then allocates a resource block for the two paired relay nodes 30 (the relay node 30A and the relay node 30B) to exchange information with each other (S420).

Then, the management server 16 transmits resource information indicating the resource block for exchanging information to the base station 10A to which the relay node 30A belongs and the base station 10B to which the relay node 30B belongs (S420, S424). Further, the base station 10A transmits the resource information to the relay node 30A, and the base station 10B transmits the resource information to the relay node 30B (S428, S432).

After that, the relay node 30A and the relay node 30B that belong to the different base stations 10 directly exchange information by using the resource block allocated by the management server 16 (S436). As a result, the relay node 30A and the relay node 30B can avoid interference between the sub-cell formed by the relay node 30A and the sub-cell formed by the relay node 30B based on the exchanged information.

3. Second Embodiment

The first embodiment of the present invention is described in the foregoing. In the following, a second embodiment of the present invention is described. The second embodiment of the present invention is different from the first embodiment mainly in that an entity that allocates a resource block for information exchange is not the management server 16.

Configuration of Relay Node

Figure 15:
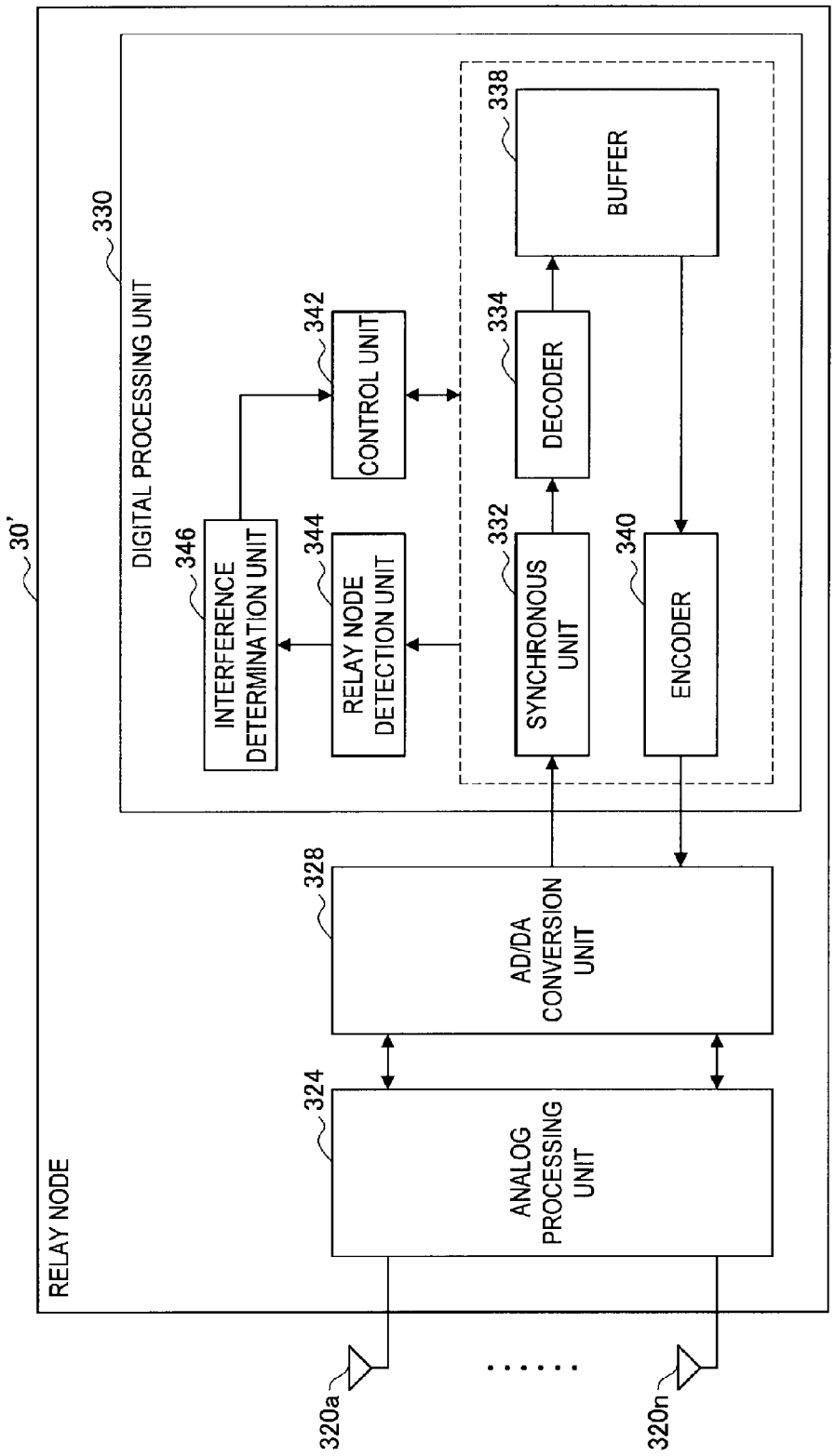
FIG. 15 is a functional block diagram showing a configuration of the relay node 30' according to the second embodiment of the present invention.

FIG. 15 is a functional block diagram showing a configuration of a relay node 30' according to the second embodiment. Referring to FIG. 15, the relay node 30' includes a plurality of antennas 320a to 320n, an analog processing unit 324, an AD/DA conversion unit 328, and a digital processing unit 330. The digital processing unit 330 includes a synchronous unit 332, a decoder 334, a buffer 338, an encoder 340, a control unit 342, a relay node detection unit 344, and an interference determination unit 346.

The synchronous unit 332, the decoder 334, the encoder 340 and so on, together with the plurality of antennas 320a to 320n, the analog processing unit 324 and the AD/DA conversion unit 328, function as a receiving unit, a transmitting unit and a relay unit for communicating with the base station 10 or the user equipment 20. The elements that function as a receiving unit, a transmitting unit and a relay unit are substantially the same as those of the first embodiment, and detailed explanation thereof is thus omitted.

Hereinafter, the control unit 342, the relay node detection unit 344 and the interference determination unit 346 are described in each case of where the relay node 30' is able to receive a signal from an adjacent base station and where it is unable to receive a signal from an adjacent base station.

When Signal is Receivable from Adjacent Base Station

The relay node detection unit 344 acquires control information such as scheduling information from PDCCH or PBCH that is received from an adjacent base station (a base station adjacent to the base station 10 to which the relay node 30' belongs) and detects the existence of an adjacent relay node that belongs to the adjacent base station 10. Not that, when the adjacent base station operates in MBSFN with the adjacent relay node, the relay node detection unit 344 may acquire control information from R-PDCCH that is received from the adjacent base station.

The interference determination unit 346 determines whether the adjacent relay node detected by the relay node detection unit 344 is likely to interfere with the relay node 30'. For example, the interference determination unit 346 may refer to the scheduling information of the adjacent relay node and determine that it is likely to interfere when there is a resource block that overlaps in time-frequency with the scheduling information of the relay node 30'.

The control unit 342 performs connection processing in such a way that the relay node 30' is connected so as to belong to the adjacent relay node which is determined by the interference determination unit 346 to be likely to interfere by the access link. For example, the control unit 342 may explicitly notify ID of the adjacent relay node to the adjacent base station when making UL synchronization and connection registration with the adjacent base station.

Further, the adjacent base station can determine that relay by an adjacent relay node is necessary when CQI of the relay node 30' is low. Thus, the control unit 342 may transmit a CQI report indicating a low CQI or a high Qos request to the adjacent base station.

As a result, the relay node 30' is connected to belong to the adjacent relay node as a pseudo-user equipment 20, and a resource block for the relay node 30' and the adjacent relay node to communicate by the access link is allocated by the adjacent base station. The relay node 30' can thereby transmit information held by the relay node 30' to the adjacent base station by using UL of the access link.

The relay node 30' adds an identifier indicating that it is information from a relay node belonging to a different base station to the information to be transmitted. When the identifier is added and a resource block can be reserved for DL of the access link, the adjacent relay node may transmit information held by the adjacent relay node to the relay node 30' by using DL of the access link.

Note that the relay node 30' may be in multi-link connection with an adjacent relay node. Specifically, the relay node 30' may be connected with an adjacent relay node while maintaining connection with the base station 10. Further, the relay node 30' may be connected with an adjacent base station while maintaining connection with the base station 10. Furthermore, when an adjacent relay node has permission for connection with the relay node 30', the control unit 342 may directly perform UL synchronization and connection processing with the adjacent relay node. Further, although the case where the relay node 30' is connected with an adjacent relay node by using the access link is described above, connection may be made by using the relay link, not the access link.

When Signal is not Receivable from Adjacent Base Station

The relay node 30' intermittently performs reception processing based on control by the control unit 342. The relay node detection unit 344 detects the existence of an adjacent relay node based on whether a signal is received from an adjacent relay node by the intermittent reception processing.

The interference determination unit 346 determines whether the adjacent relay node detected by the relay node detection unit 344 is likely to interfere with the relay node 30'. For example, the interference determination unit 346 may refer to scheduling information contained in PDCCH received from the adjacent relay node and determine that it is likely to interfere when there is a resource block that overlaps in time-frequency with the scheduling information of the relay node 30'.

The control unit 342 performs connection processing in such a way that the relay node 30' is connected so as to belong to the adjacent relay node which is determined by the interference determination unit 346 to be likely to interfere by the access link. For example, the control unit 342 may perform connection processing with the adjacent base station through the base station 10 or may directly perform connection processing with the adjacent relay node.

As a result, the relay node 30' is connected to belong to the adjacent relay node as a pseudo-user equipment 20, and a resource block for the relay node 30' and the adjacent relay node to communicate by the access link is allocated by the adjacent base station. The relay node 30' can thereby transmit information held by the relay node 30' to the adjacent base station by using UL of the access link.

The relay node 30' adds an identifier indicating that it is information from a relay node belonging to a different base station to the information to be transmitted. When the identifier is added and a resource block can be reserved for DL of the access link, the adjacent relay node may transmit information held by the adjacent relay node to the relay node 30' by using DL of the access link.

Note that the relay node 30' may be in multi-link connection with an adjacent relay node. Specifically, the relay node 30' may be connected with an adjacent relay node while maintaining connection with the base station 10. Further, the relay node 30' may be connected with an adjacent base station while maintaining connection with the base station 10. Although the case where the relay node 30' is connected with an adjacent relay node by using the access link is described above, connection may be made by using the relay link, not the access link.

Operation of Second Embodiment

The configuration according to the second embodiment of the present invention is described above. Hereinafter, the operation according to the second embodiment of the present invention is described.

Figure 16:
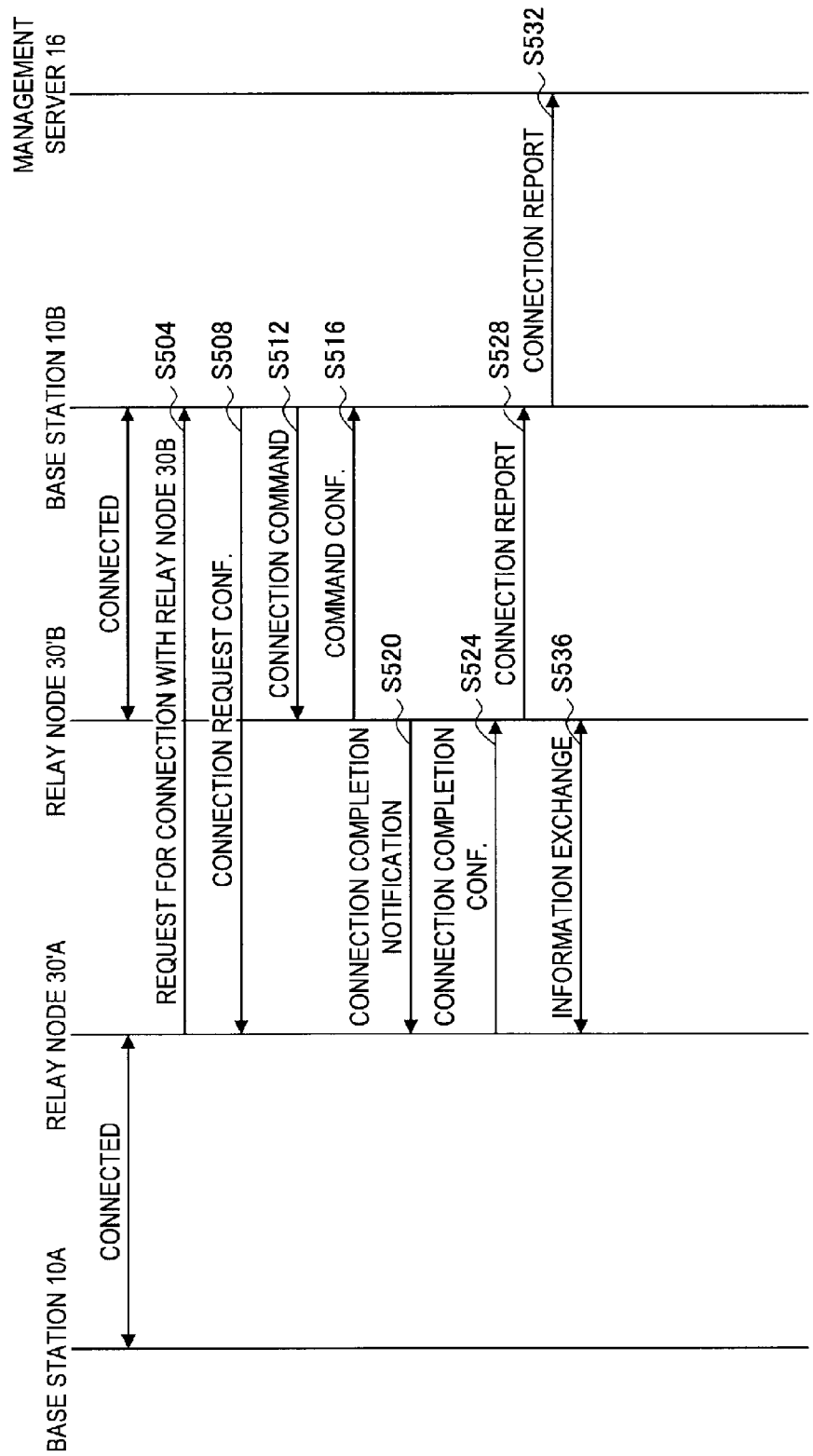
FIG. 16 is a sequence chart showing a flow for connection processing by the second embodiment of the present invention.

FIG. 16 is a sequence chart showing an example of connection processing in the case where the relay node 30'A is located in the place where it can communicate with the base station 10B, which is an adjacent base station. In the example shown in FIG. 16, the relay node 30'A and the base station 10A are connected, and the relay node 30'B and the base station 10B are connected. When the relay node 30'A determines that it is likely to interfere with the relay node 30'B, the relay node 30'A makes a request for connection with the relay node 30'B to the base station 10B (S504).

The base station 10B transmits a connection request confirmation to the relay node 30'A as a response to the request (S508), and transmits a connection command for connection with the relay node 30'A to the relay node 30'B (S512).

Then, the relay node 30'B transmits a command confirmation to the base station 10B as a response to the connection command (S516), performs processing for connection with the relay node 30'A, and then gives a connection completion notification to the relay node 30'A (S520). The relay node 30'A then transmits a connection completion confirmation to the relay node 30'B as a response to the connection completion notification (S524). After that, the relay node 30'B gives a report that it is connected with the relay node 30'A to the management server 16 through the base station 10B (S528, S532).

Figure 17:
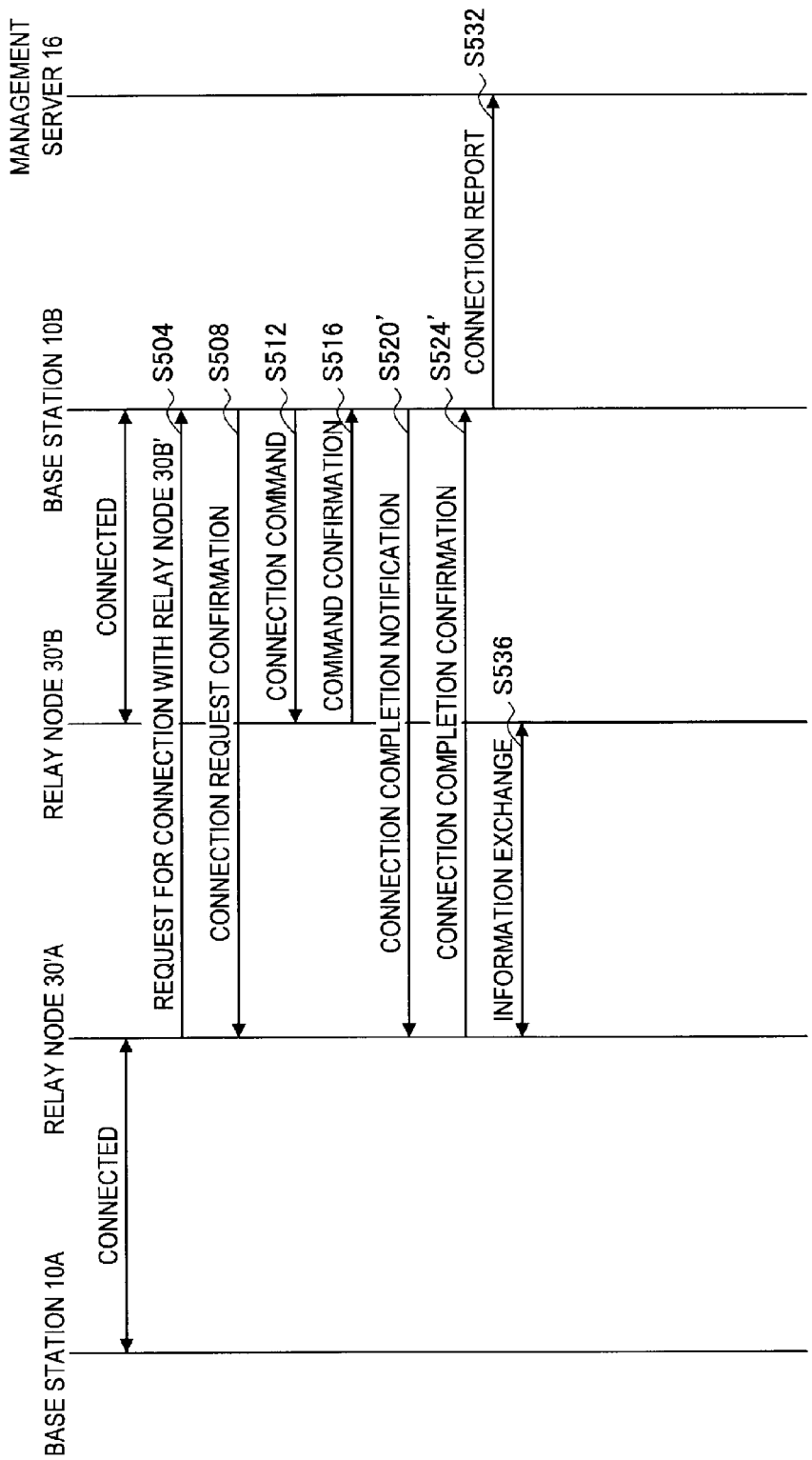
FIG. 17 is a sequence chart showing a flow for connection processing by the second embodiment of the present invention.

By the above process, the relay node 30'A and the relay node 30'B are connected by the access link, and they can exchange information by using the resource block allocated to the access link (S536). Note that communication in S520 and S524 may be performed directly between the base station 10B and the relay node 30'A as shown in S520' and S524' in an alternative example in FIG. 17. In this case, the relay node 30'B may give the connection completion notification to the base station 10B also in S516 and does not perform communication (connection report) in S528 shown in FIG. 16.

Figure 18:
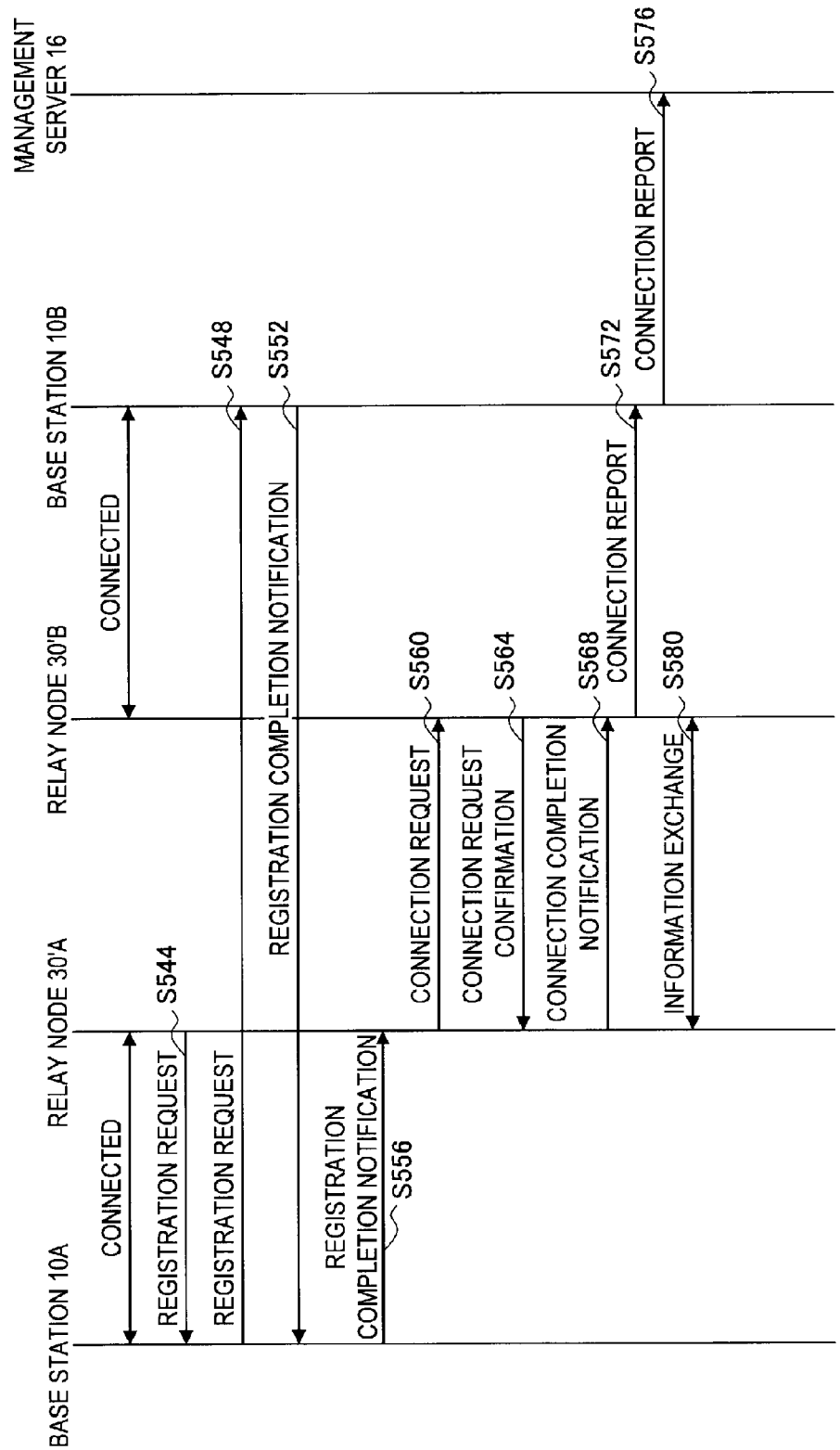
FIG. 18 is a sequence chart showing a flow for connection processing by the second embodiment of the present invention.

FIG. 18 is a sequence chart showing an example of connection processing in the case where the relay node 30'A is located outside the communication range of the base station 10B, which is an adjacent base station. As shown in FIG. 18, when the relay node 30'A determines that it is likely to interfere with the relay node 30'B, the relay node 30'A makes a request for registration necessary for connection with the relay node 30'B to the base station 10B through the base station 10A and the backbone network 12 (S544, S548).

Then, the base station 10B makes registration as requested and gives a connection completion notification indicating that registration is completed to the relay node 30'A through the backbone network 12 the base station 10A (S552, S556). After that, the relay node 30'A transmits a connection request to the relay node 30'B (S560), and the relay node 30'B transmits a connection request confirmation to the relay node 30'A as a response to the connection request (S564).

Then, after the relay node 30'B receives a connection completion notification from the relay node 30'A (S568), the relay node 30'B gives a report that it is connected with the relay node 30'A to the management server 16 through the base station 10B (S572, S576). By the above process, the relay node 30'A and the relay node 30'B are connected by the access link, and they can exchange information by using the resource block allocated to the access link (S580).

Figure 19:
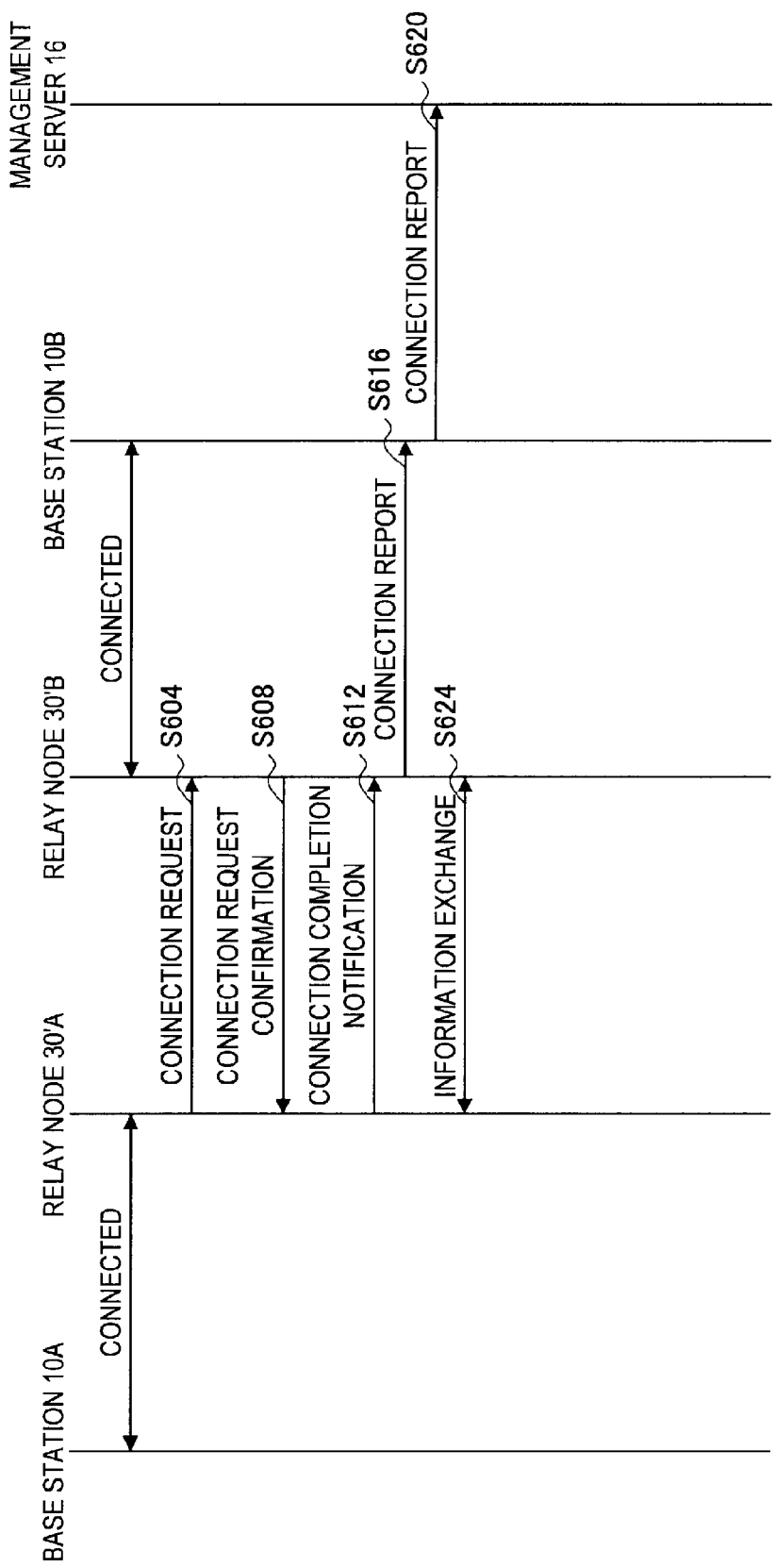
FIG. 19 is a sequence chart showing a flow for connection processing by the second embodiment of the present invention.

FIG. 19 is a sequence chart showing an example of connection processing in the case where the relay node 30'A is located outside the communication range of the base station 10B, which is an adjacent base station, and the relay node 30'B has permission for connection with the relay node 30'A. As shown in FIG. 19, when the relay node 30'A determines that it is likely to interfere with the relay node 30'B, the relay node 30'A makes a request for connection directly to the relay node 30'B (S604). Then, the relay node 30'B performs processing necessary for connection and transmits a connection request confirmation to the relay node 30'A as a response to the connection request (S608).

Then, after the relay node 30'B receives a connection completion notification from the relay node 30'A (S612), the relay node 30'B gives a report that it is connected with the relay node 30'A to the management server 16 through the base station 10B (S616, S620). By the above process, the relay node 30'A and the relay node 30'B are connected by the access link, and they can exchange information by using the resource block allocated to the access link (S624).

4. Other Applications of Invention

As described above, a plurality of relay nodes 30 and 30' exchange information by using given communication resources. However, the above-described relay node 30 and 30' is just an example of small-to-medium-sized base stations in the heterogeneous network described below. Therefore, it is also within the scope of the present invention that a plurality of small-to-medium-sized base stations exchange information by radio using the given communication resources.

A heterogeneous network is a network where a plurality of small-to-medium-sized base stations coexist in a macro cell by performing overlay transmission or spectrum sharing. The small-to-medium-sized base station may be a RRH (Remote RadioHead) cell base station, a hotzone base station (Pico/micro cell eNB), a femtocell base station (Home eNB), a relay node (relay base station) or the like. The heterogeneous network architecture is specifically described below.

Figure 20:
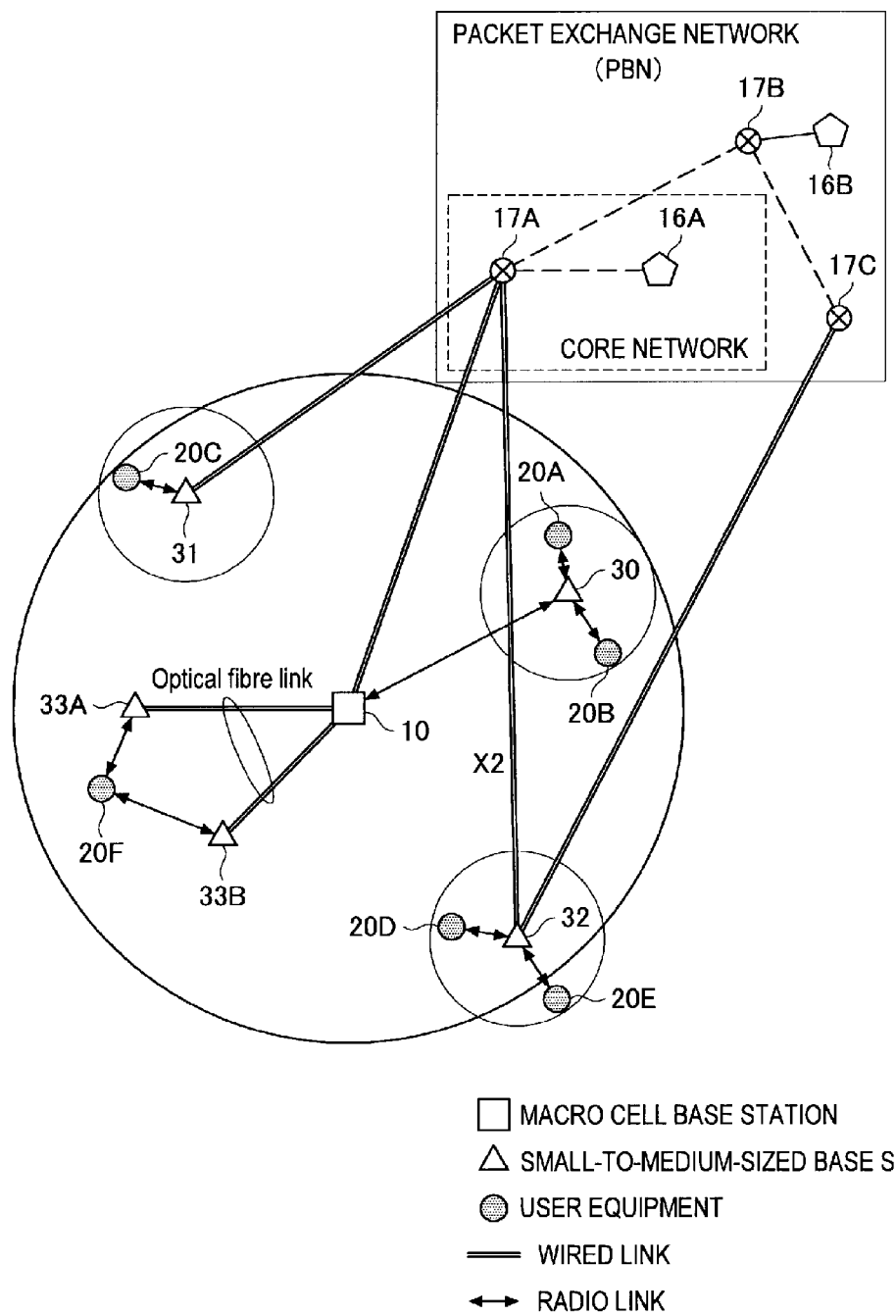
FIG. 20 is an explanatory view showing an example of heterogeneous network architecture.

FIG. 20 is an explanatory view showing an example of heterogeneous network architecture. Referring to FIG. 20, the heterogeneous network includes a macro cell base station 10 (which is synonymous with a base station 10), a relay node 30, a hotzone base station 31, a femtocell base station 32, RRH cell base stations 33 and management servers 16A and 16B.

The management servers 16A and 16B have functions for the macro cell base station 10 and the small-to-medium-sized base stations to operate in cooperation with each other. For example, as described above in <2. First Embodiment (Configuration of Management Server)>, the management server 16A receives information (position information, scheduling information, Qos information etc.) related to the macro cell base station 10 or the user equipment 20 belonging to the small-to-medium-sized base station, pairs small-to-medium-sized base stations that are likely to cause interference with each other, or allocates a resource block for information exchange. Note that the functions of the management server 16 may be incorporated into the macro cell base station 10 or any one of the small-to-medium-sized base stations, and the macro cell base station 10 and the small-to-medium-sized base stations in which the functions are incorporated may perform central control. Or the functions of the management server 16 may be incorporated into a plurality of parts of the macro cell base station 10 or the small-to-medium-sized base stations, and the macro cell base station 10 or the small-to-medium-sized base stations in which the functions are incorporated may perform autonomous control.

The macro cell base station 10 manages the small-to-medium-sized base stations and the user equipment 20 in the macro cell. The configuration of the macro cell base station 10 is described above in <2. First Embodiment (Configuration of Base Station)>.

The hotzone base station 31 has the smaller maximum transmission power than the macro cell base station 10 and communicates with the macro cell base station 10 with use of an interface such as X2 or S1 of a core network. Note that the hotzone base station 31 creates OSG (Open Subscriber Group) which is accessible from any user equipment 20.

The femtocell base station 32 has the smaller maximum transmission power than the macro cell base station 10 and communicates with the macro cell base station 10 with use of a packet exchange network such as ADSL. Alternatively, the femtocell base station 32 may communicate with the macro cell base station 10 by a radio link. Note that the femtocell base station 32 creates CSG (Closed Subscriber Group) which is accessible only from limited user equipment 20.

The RRH cell base station 33 is connected with the macro cell base station 10 by an optical fiber. Thus, the macro cell base station 10 transmits signals to the RRH cell base stations 33A and 33B installed in geographically different places through the optical fiber and allows the RRH cell base stations 33A and 33B to transmit signals by radio. For example, only the RRH cell base stations 33 close to the position of the user equipment 20 may be used. Note that functions related to a control system are incorporated into the macro cell base station 10, and optimum transmission mode is selected according to the distribution of the user equipment 20.

Figure 22:
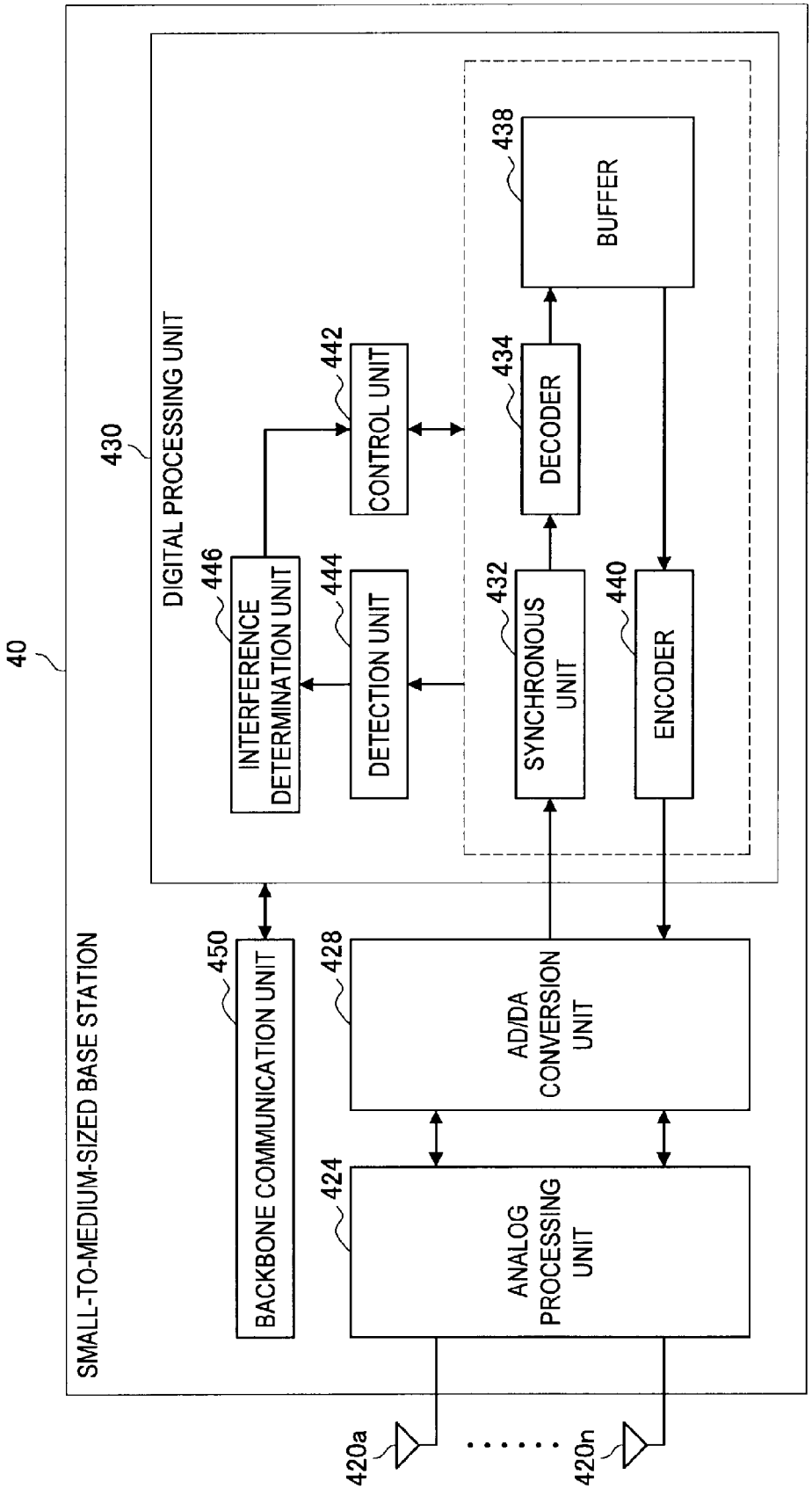
FIG. 22 is an explanatory view showing an example configuration of a small-to-medium-sized base station.

FIG. 21 shows the overview of the respective small-to-medium-sized base stations described above. The example of configuration of small-to-medium-sized base stations 40 such as the hotzone base station 31 and the femtocell base station 32 is illustrated in FIG. 22. As illustrated in FIG. 22, the small-to-medium-sized base stations 40 such as the hotzone base station 31 and the femtocell base station 32 include a backbone communication unit 450 in order to communicate with the network side by wire. On the other hand, other configurations of the small-to-medium-sized base stations 40 are assumed to be substantially the same with the relay node 30' explained with the reference to FIG. 15 (or with the relay node 30 explained with the reference to FIG. 11).

The small-to-medium-sized base stations 40 like the above can avoid interference with other communications by exchanging information using given communication resources. Hereinafter, exchanging information between the small-to-medium-sized base stations 40 will be described after explaining an interference model and an interference avoidance control in a heterogeneous network.

Interference Model in Heterogeneous Network

Figure 23:
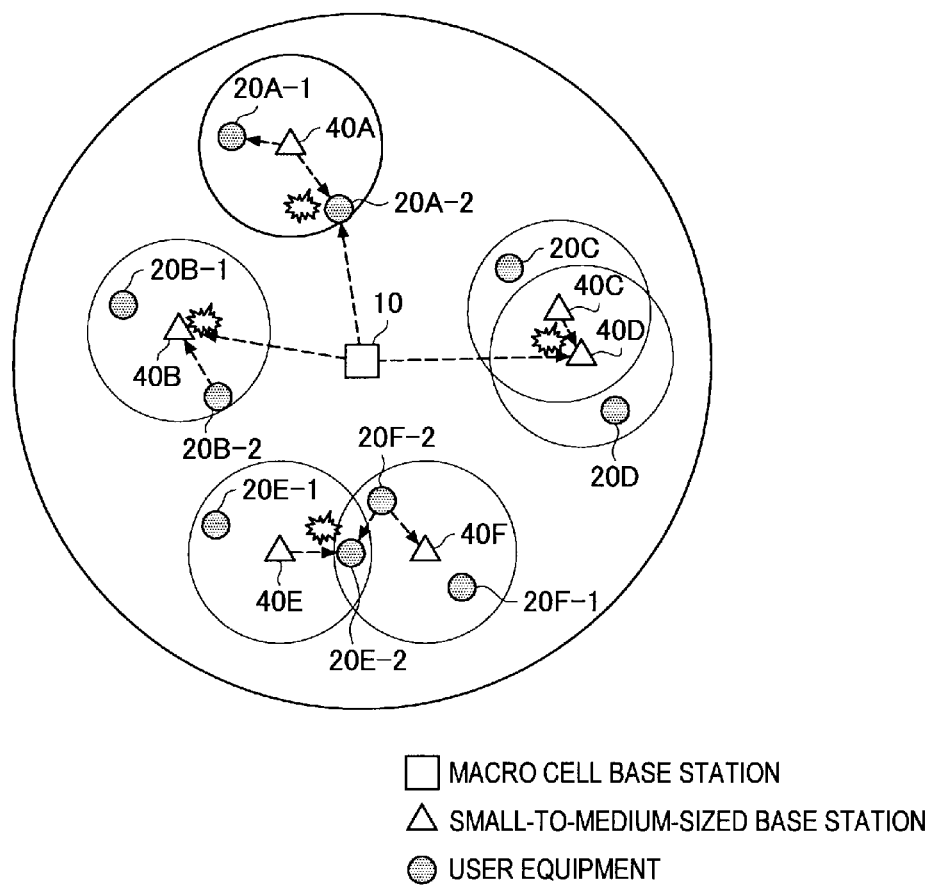
FIG. 23 is an explanatory view showing an interference model in a heterogeneous network.

FIG. 23 is an explanatory view showing the interference model in a heterogeneous network. In FIG. 23 and FIGS. 24 to 26 described later, the relay node 30, the hotzone base station 31, the femtocell base station 32 and so on are not particularly distinguished from one another, and they are simply shown as small-to-medium-sized base stations 40.

Referring to FIG. 23, the occurrence of the following interferences is assumed in the heterogeneous network.

(1) Interference between a transmission signal from a small-to-medium-sized base station 40A and a transmission signal from the macro cell base station 10 occurring at user equipment 20A-2.

(2) Interference between a transmission signal from user equipment 20B-2 and a transmission signal from the macro cell base station 10 occurring at a small-to-medium-sized base station 40B.

(3) Interference between a transmission signal from a small-to-medium-sized base station 40C and a transmission signal from the macro cell base station 10 occurring at a small-to-medium-sized base station 40D.

(4) Interference between a transmission signal from a small-to-medium-sized base station 40 and a transmission signal from user equipment 20F-2 occurring at user equipment 20E-2.

Interference Avoidance Control in Heterogeneous Network

Although various kinds of interferences occur in the heterogeneous network as described above, the interferences can be is solved by a handover, transmission power control, or beamforming. An example of interference avoidance control is specifically described below.

Figure 24:
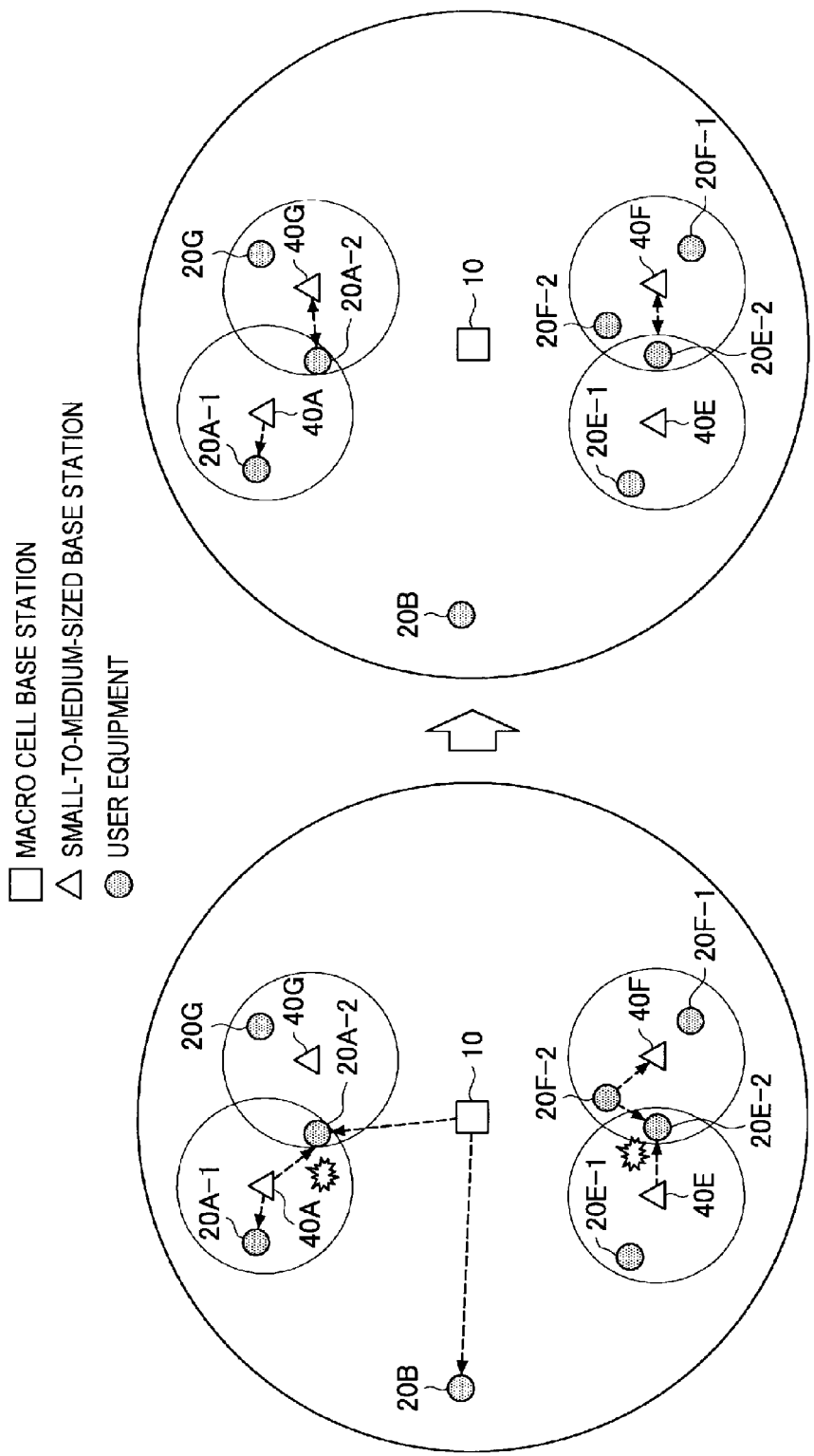
FIG. 24 is an explanatory view showing an example of interference avoidance by handover.

FIG. 24 is an explanatory view showing an example of interference avoidance by handover. In the left part of FIG. 24, a transmission signal from the small-to-medium-sized base station 40A and a transmission signal from the macro cell base station 10 interfere at the user equipment 20A-2. In this case, the interference can be solved by the handover of the user equipment 20A-2 from the small-to-medium-sized base station 40A to a small-to-medium-sized base station 40G with different transmission timing from the macro cell base station 10.

Further, in the left part of FIG. 24, a transmission signal from the small-to-medium-sized base station 40E and a transmission signal from the user equipment 20F-2 interfere at the user equipment 20E-2. In this case, the interference can be solved by the handover of the user equipment 20E-2 from the small-to-medium-sized base station 40E to the small-to-medium-sized base station 40F. Note that the small-to-medium-sized base station 40E and the small-to-medium-sized base station 40F may exchange the information necessary at the time of the handover by using a resource block allocated by the management server 16.

Figure 25:
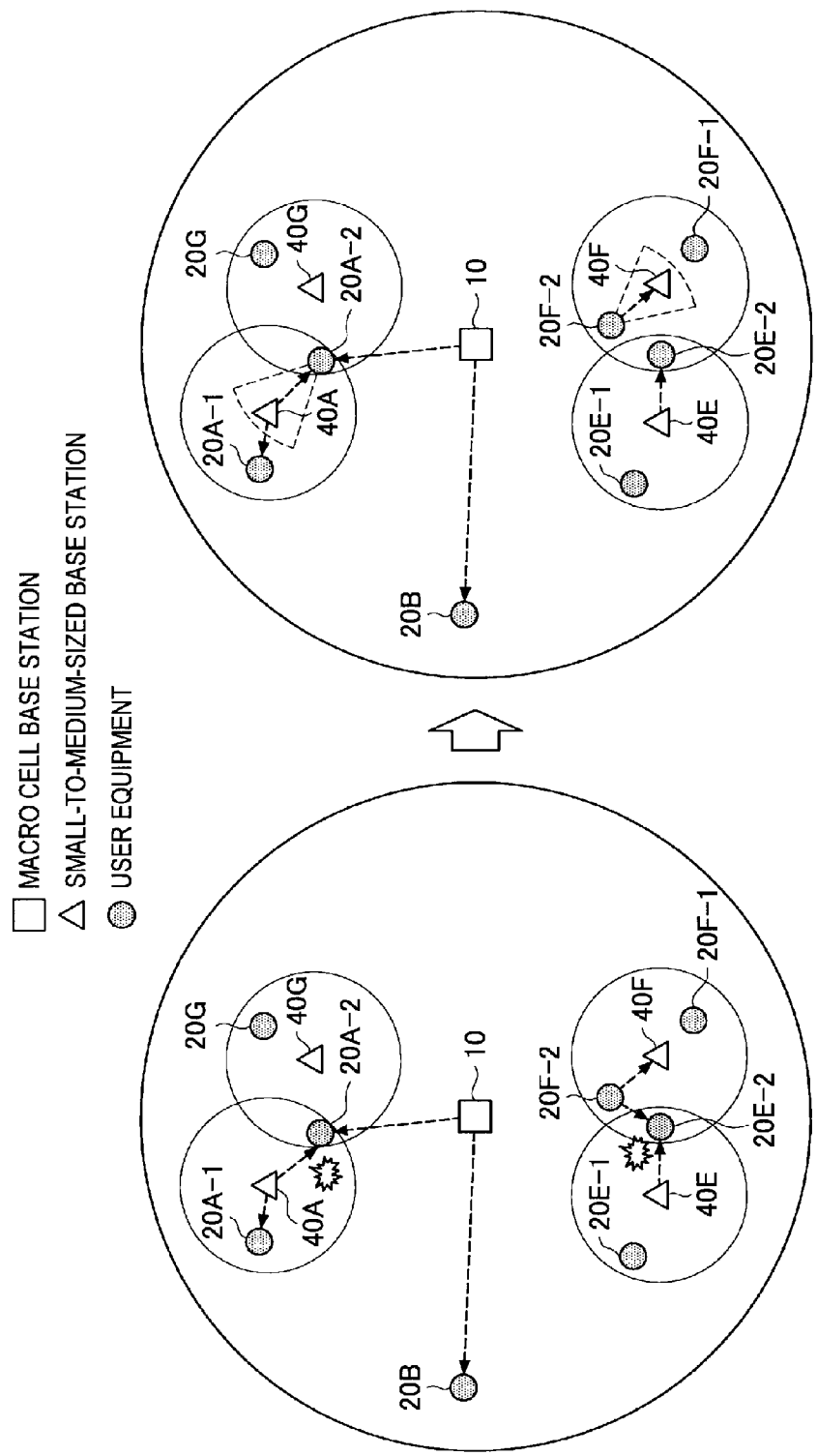
FIG. 25 is an explanatory view showing an example of interference avoidance by beamforming.

FIG. 25 is an explanatory view showing an example of interference avoidance by beamforming. In the left part of FIG. 25, a transmission signal from the small-to-medium-sized base station 40A and a transmission signal from the macro cell base station 10 interfere at the user equipment 20A-2. In this case, the interference can be solved by directing the reception directivity of the user equipment 20A-2 toward the direction where the small-to-medium-sized base station 40A is placed.

Further, in the left part of FIG. 25, a transmission signal from the small-to-medium-sized base station 40E and a transmission signal from the user equipment 20F-2 interfere at the user equipment 20F-2. In this case, the interference can be solved by directing the transmission directivity of the user equipment 20F-2 toward the direction where the small-to-medium-sized base station 40F is placed because the transmission signal from the user equipment 20F-2 thereby does not reach the user equipment 20E-2. Note that the small-to-medium-sized base station 40F receives the interference status due to the user equipment 20F-2, the position information of the user equipment 20E-2 or the like from the small-to-medium-sized base station 40E using a resource block allocated by the management server 16, for example, and realizes interference avoidance control based on the received information.

Figure 26:
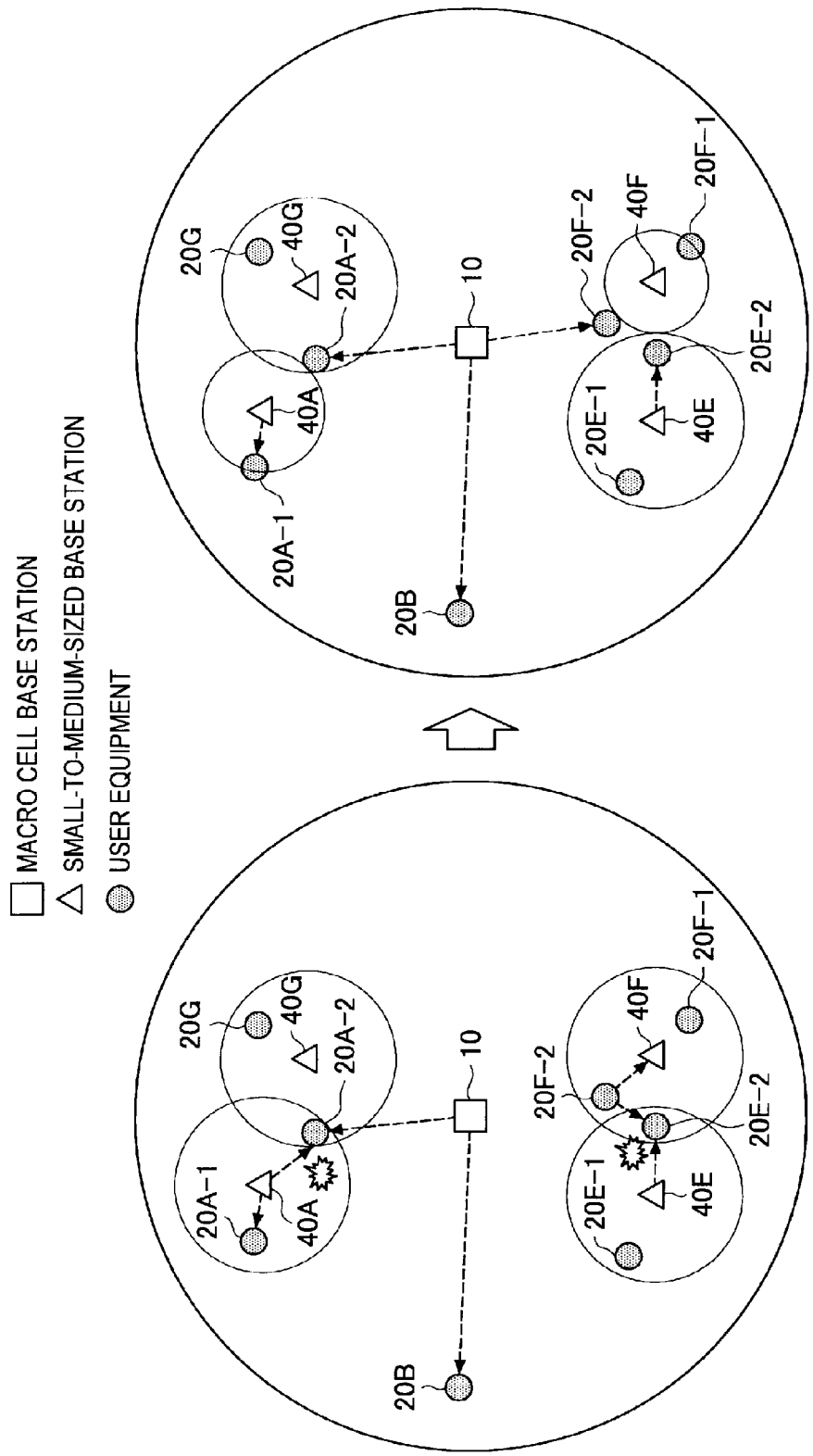
FIG. 26 is an explanatory view showing an example of interference avoidance by transmission power control.

FIG. 26 is an explanatory view showing an example of interference avoidance by transmission power control. In the left part of FIG. 26, a transmission signal from the small-to-medium-sized base station 40A and a transmission signal from the macro cell base station 10 interfere at the user equipment 20A-2. In this case, if the transmission power of the small-to-medium-sized base station 40A is lowered, the user equipment 20A-2 is excluded from the radio range of the small-to-medium-sized base station 40A, and thus the connection between the user equipment 20A-2 and the small-to-medium-sized base station 40A is shut down. The user equipment 20A-2 thereby searches for a new connection and makes a connection to the macro cell base station 10, for example. Therefore, the interference can be solved by lowering the transmission power of the small-to-medium-sized base station 40A.

Further, in the left part of FIG. 26, a transmission signal from the small-to-medium-sized base station 40E and a transmission signal from the user equipment 20F-2 interfere at the user equipment 20E-2. In this case, if the transmission power of the small-to-medium-sized base station 40F is lowered, the user equipment 20F-2 is excluded from the radio range of the small-to-medium-sized base station 40F, and thus the connection between the user equipment 20F-2 and the small-to-medium-sized base station 40F is shut down. The user equipment 20F-2 thereby searches for a new connection and makes a connection to the macro cell base station 10, for example. Therefore, the interference can be solved by lowering the transmission power of the small-to-medium-sized base station 40F. Note that the small-to-medium-sized base station 40F receives the interference status due to the user equipment 20F-2 or the like from the small-to-medium-sized base station 40E using a resource block allocated by the management server 16, for example, and realizes interference avoidance control based on the received information.

Information Exchange Method

Figure 27:
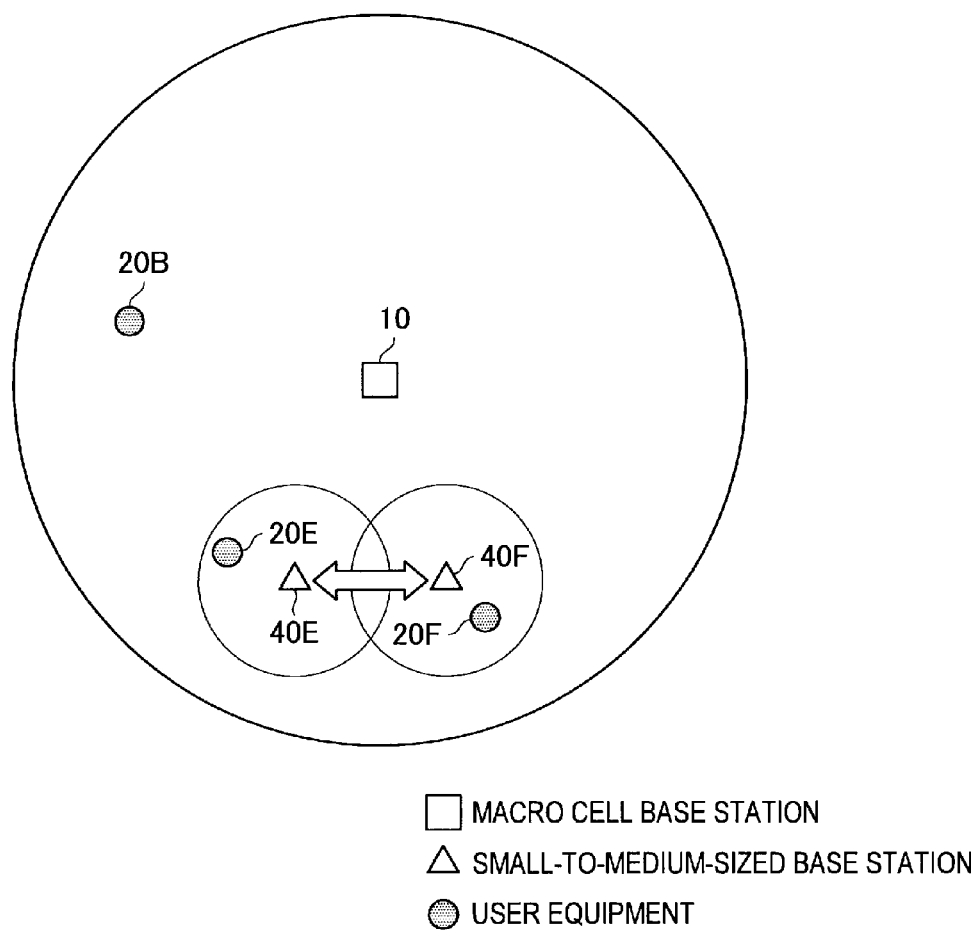
FIG. 27 is an explanatory view showing a situation that small-to-medium-sized base stations directly exchange information.

The small-to-medium-sized base station 40 can directly exchange information by radio with a nearby small-to-medium-sized base station 40 in compliance with any of the method described in <2. First Embodiment> and the method described in <3. Second Embodiment>. For example, as shown in FIG. 27, the small-to-medium-sized base stations 40E and 40F located in the same macro cell can directly exchange information with each other.

Specifically, as described in <2. First Embodiment>, the small-to-medium-sized base station 40 can exchange information with the nearby small-to-medium-sized base station 40 paired by the management server 16 by using a resource block which is allocated by the management server 16.

Further, as described in <3. Second Embodiment>, the small-to-medium-sized base station 40 may be connected with the nearby the nearby small-to-medium-sized base station 40 as user equipment and exchange information by using a resource block which is allocated from the nearby small-to-medium-sized base station 40 as a communication resource for the access link. This is described hereinafter by way of illustration with reference to FIG. 28.

FIG. 28 is an explanatory view showing a sequence for information exchange between a plurality of small-to-medium-sized base stations 40. FIG. 28 shows an example in which the small-to-medium-sized base stations 40E and 40F are under management of the macro cell base station 10.

First, when the small-to-medium-sized base station 40E determines that interference is likely to occur between communication controlled by the small-to-medium-sized base station 40E and communication controlled by the small-to-medium-sized base station 40F, the small-to-medium-sized base station 40E makes a request for connection with the small-to-medium-sized base station 40F to the macro cell base station 10 (S704). Although each small-to-medium-sized base station 40 has an interface for making direct communication with the management server 16 in some cases, because it is under management of the macro cell base station 10, it performs communication for information exchange with the macro cell base station 10.

It should be noted that an interfaces between the macro cell base station 10 and the small-to-medium-sized base station 40 differs depending on the type of the small-to-medium-sized base station 40. For example, when the small-to-medium-sized base station 40 is the hotzone base station 31, the small-to-medium-sized base station 40 and the macro cell base station 10 perform communication by using the X2 interface. Further, when the small-to-medium-sized base station 40 is the femtocell base station 32, the small-to-medium-sized base station 40 and the macro cell base station 10 perform communication by making tunneling of the X2 interface to the packet exchange network.

The macro cell base station 10 transmits a connection request confirmation to the small-to-medium-sized base station 40E as a response to the request from the small-to-medium-sized base station 40E (S708), and transmits a connection command for connection with the small-to-mediumsized base station 40E to the small-to-medium-sized base station 40F (S712). Then, the macro cell base station 10 receives a command confirmation from the small-to-medium-sized base station 40F as a response to the connection command (S716), performs scheduling of a connection parameter for connection between the small-to-medium-sized base station 40E and the small-to-medium-sized base station 40F, and then transmits the connection parameter to the small-to-medium-sized base station 40E (S724).

After that, the small-to-medium-sized base station 40E and the small-to-medium-sized base station 40F perform connection processing according to the connection parameter transmitted from the macro cell base station 10 (S728). In the process of the connection processing, adjustment of transmission/reception timing or transmission power may be performed between the small-to-medium-sized base station 40E and the small-to-medium-sized base station 40F. Then, the small-to-medium-sized base station 40F gives a connection completion notification to the small-to-medium-sized base station 40E (S732), and the small-to-medium-sized base station 40E transmits a connection completion confirmation to the small-to-medium-sized base station 40F as a response to the connection completion notification (S736).

Then, the small-to-medium-sized base station 40F gives a report that it is connected with the small-to-medium-sized base station 40E to the management server 16 through the macro cell base station 10 (S740, S744). By the above process, the small-to-medium-sized base station 40E and the small-to-medium-sized base station 40F can reserve the link that enables radio connection and directly exchange information by using the resource block allocated to the radio link (S748).

Summary

As described above, according to the first embodiment of the present invention, small-to-medium-sized base stations such as the relay nodes 30 can directly exchange information with each other by using a resource block allocated by the management server 16. Further, according to the second embodiment of the present invention, a small-to-medium-sized base station such as the relay node 30' performs connection processing so as to belong to an adjacent small-to-medium-sized base station, and therefore it can directly exchange information with the adjacent small-to-medium-sized base station by using the access link. Because the direct information exchange enables reduction of delay time compared to information exchange performed by the base stations 10 through the backbone network 12, it is possible to achieve the operation for avoiding interference speedily according to a change in communication status.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, it is not always necessary to execute the respective steps in the processing of the communication system 1 in this specification in chronological order according to the sequence shown in the sequence charts. For example, the respective steps in the processing of the communication system 1 may be executed in the sequence different from the sequence shown in the sequence charts or may be executed in parallel.

Furthermore, it is possible to create a computer program that causes hardware such as a CPU, ROM and RAM incorporated in the relay node 30, the management server 16 and so on to function equally to the respective elements of the relay node 30, the management server 16 and so on described above. Further, a memory medium that stores such a computer program may be provided.

REFERENCE SIGNS LIST

10 Base station
16 Management server
20 User equipment
30, 30' Relay node
124, 224, 324 Analog processing unit
128, 228, 328 AD/DA conversion unit
130, 230, 330 Digital processing unit
134, 234, 334 Decoder
140, 240, 340 Encoder
142, 242, 342 Control unit
164 Pairing unit
166 Resource allocation unit
232, 332 Synchronous unit
338 Buffer

The invention claimed is:

1. A relay node in a mobile communication network for receiving a radio signal from a first base station associated with the relay node and forwarding the signal to a mobile station, the relay node comprising:
a transmitter;
a receiver; and
circuitry configured to
manage first information corresponding to a link between the relay node and the mobile station;
control the transmitter to transmit, to a second base station not associated with the relay node, a request to connect to another relay node, the another relay node associated with the second base station and the another relay node and the second base station being in the mobile communication network;
control the receiver to receive, from the second base station, a connection request response;
control the transmitter to directly transmit, when the connection request response indicates authorization to exchange information with the another relay node, the first information to the another relay node;
control the receiver to receive, from the another relay node when the connection request response indicates authorization to exchange information with the another relay node, second information corresponding to a link between the another relay node and another mobile station; and
control resources used to communicate with the mobile station based on the first information corresponding to the link between the relay node and the mobile station and the second information corresponding to the link between the another relay node and the another mobile station.

2. The relay node of claim 1, wherein
the circuitry is configured to determine that the link between the another relay node and the another mobile station may interfere with the link between the relay node and the mobile station based on the first information corresponding to the link between the relay node and the mobile station and the second information corresponding to the link between the another relay node and the another mobile station.

3. The relay node of claim 2, wherein
the circuitry is configured to modify resources used to communicate with the mobile station based on the determination that the link between the another relay node and the another mobile station may interfere with the link between the relay node and the mobile station.

4. The relay node of claim 1, wherein
the receiver is configured to receive resource allocation information from the base station indicating communication resources assigned to the relay node for directly communicating with the another relay node, and
the transmitter is configured to directly transmit the first information to the another relay node in the mobile communication network based on the resource allocation information received from the base station.

5. The relay node of claim 1, wherein the circuitry is configured to detect the existence of the another relay node by detecting a signal transmitted from the another relay node.

6. The relay node of claim 5, wherein the circuitry is configured to determine that the signal detected by the relay node detection unit may interfere with the link between the relay node and the mobile station.

7. The relay node of claim 5, wherein the circuitry is configured to
detect the existence of the another relay node based on signals transmitted from the second base station to which the another relay node is linked, and
control the transmitter to transmit, to the second base station, a request to establish a direct communication link with the another relay node.

8. The relay node of claim 5, wherein the circuitry is configured to
detect the existence of the another relay node based on signals transmitted from the another relay node, and
control the transmitter to transmit, to the second base station, a request to establish a direct communication link with the another relay node.

9. The relay node of claim 5, wherein the circuitry is configured to
detect the existence of the another relay node based on signals transmitted from the another relay node, and
control the transmitter to transmit, to the another relay node, a request to establish a direct communication link with the another relay node.

10. The relay node of claim 1, wherein the first information corresponding to the link between the relay node and the mobile station includes identification information corresponding to the mobile station.

11. The relay node of claim 1, wherein the first information corresponding to the link between the relay node and the mobile station includes an allowable interference level corresponding to the link between the relay node and the mobile station.

12. The relay node of claim 1, wherein the first information corresponding to the link between the relay node and the mobile station includes a channel quality indicator (CQI) corresponding to the link between the relay node and the mobile station.

13. The relay node of claim 1, wherein the first information corresponding to the link between the relay node and the mobile station includes quality of service (QoS) information corresponding to a required quality of the link between the relay node and the mobile station.

14. The relay node of claim 1, wherein the first information corresponding to the link between the relay node and the mobile station includes a position of the relay node.

15. A non-transitory computer readable medium including computer program instructions, which when executed by a relay node in a communication network, cause the relay node to perform a method of receiving a radio signal from a first base station associated with the relay node and forwarding the signal to a mobile station, the method comprising:
managing first information corresponding to a link between the relay node and the mobile station;
transmitting, to a second base station not associated with the relay node, a request to connect to another relay node, the another relay node associated with the second base station and the another relay node and the second base station being in the mobile communication network;
receiving, from the second base station, a connection request response;
directly transmitting, when the connection request response indicates authorization to exchange information with the another relay node, the first information to the another relay node;
receiving, from the another relay node when the connection request response indicates authorization to exchange information with the another relay node, second information corresponding to a link between the another relay node and another mobile station; and
controlling resources used to communicate with the mobile station based on the first information corresponding to the link between the relay node and the mobile station and the second information corresponding to the link between the another relay node and the another mobile station.

16. The non-transitory computer readable medium of claim 15, further comprising:
determining that the link between the another relay node and the another mobile station may interfere with the link between the relay node and the mobile station based on the first information corresponding to the link between the relay node and the mobile station and the second information corresponding to the link between the another relay node and the another mobile station.

17. The non-transitory computer readable medium of claim 16, further comprising:
modifying resources used to communicate with the mobile station based on the determination that the link between the another relay node and the another mobile station may interfere with the link between the relay node and the mobile station.

18. A method performed by a relay node in a communication network of receiving a radio signal from a first base station associated with the first base station and forwarding the signal to a mobile station, the method comprising:
managing, by circuitry of the relay node, first information corresponding to a link between the relay node and the mobile station;
transmitting, by a transmitter of the relay node, to a second base station not associated with the relay node, a request to connect to another relay node, the another relay node associated with the second base station and the another relay node and the second base station being in the mobile communication network;
receiving, by a receiver of the relay node, a connection request response from the second base station;
directly transmitting, by transmitter of the relay node, when the connection request response indicates authorization to exchange information with the another relay node, the first information to the another relay node;

receiving, at the receiver of the relay node from the another relay node when the connection request response indicates authorization to exchange information with the another relay node, second information corresponding to a link between the another relay node and another mobile station; and controlling, by the circuitry, of the relay node, resources used to communicate with the mobile station based on the first information corresponding to the link between the relay node and the mobile station and the second information corresponding to the link between the another relay node and the another mobile station.

19. The relay node of claim 1, wherein the circuitry is further configured to, after completion of both direct transmission of the first information of the another relay node and reception of the second information from the another relay node, transmit a notification to the base station, and the notification indicates successful exchange of the first information and second information between the relay node and the another relay node.

20. The non-transitory computer readable medium of claim 15, further comprising:

transmitting, after completion of both direct transmission of the first information of the another relay node and reception of the second information from the another relay node, a notification to the base station, wherein the notification indicates successful exchange of the first information and second information between the relay node and the another relay node.

* * * * *